(12) United States Patent
Kumon et al.

(10) Patent No.: US 8,594,974 B2
(45) Date of Patent: Nov. 26, 2013

(54) VIEWPOINT LOCATION COMPUTATION DEVICE

(75) Inventors: Hitoshi Kumon, Aichi-ken (JP); Ko Koga, Tokyo (JP); Keisuke Inoue, Yokosuka (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/634,501

(22) PCT Filed: Aug. 10, 2011

(86) PCT No.: PCT/JP2011/068328
§ 371 (c)(1),
(2), (4) Date: Sep. 12, 2012

(87) PCT Pub. No.: WO2012/023480
PCT Pub. Date: Feb. 23, 2012

(65) Prior Publication Data
US 2013/0138392 A1    May 30, 2013

(30) Foreign Application Priority Data
Aug. 16, 2010    (JP) .................................. 2010-181714

(51) Int. Cl.
*G01C 9/00*    (2006.01)
(52) U.S. Cl.
CPC ....................................... *G01C 9/00* (2013.01)
USPC .......................................................... 702/152
(58) Field of Classification Search
USPC .................... 702/152, 182–185, 188
See application file for complete search history.

(56) References Cited

U.S. PATENT DOCUMENTS

2011/0090338 A1*    4/2011    DeLine et al. ................. 348/148

FOREIGN PATENT DOCUMENTS

| JP | 07-167618 A | 7/1995 |
| JP | 10-176928 A | 6/1998 |
| JP | 2005-145219 A | 6/2005 |
| JP | 2008-189045 A | 8/2008 |
| JP | 2009-099028 A | 5/2009 |
| JP | 2007-096638 A | 4/2012 |

* cited by examiner

*Primary Examiner* — Edward Raymond
(74) *Attorney, Agent, or Firm* — Gifford, Krass, Sprinkle, Anderson & Citkowski, P.C.

(57) ABSTRACT

A viewpoint location computation device that computes a viewpoint location of a driver includes: a first estimated viewpoint location computation unit that computes a first estimated viewpoint location based on the angle of the right side-view mirror and a driver's seating center plane of the vehicle; a second estimated viewpoint computation unit that computes a second estimated viewpoint location based on the angle of the left side-view mirror and the driver's seating center plane of the vehicle; an identical condition determination unit that determines whether the estimated viewpoint locations are identical; and a viewpoint location computation unit that computes the estimated viewpoint location as the viewpoint location of the driver when it is determined that the estimated viewpoint locations are identical, wherein the viewpoint location computation unit computes the viewpoint location based on the estimated viewpoint locations when it is determined that the respective estimated viewpoint locations are not identical.

4 Claims, 21 Drawing Sheets

VIEWPOINT LOCATION COMPUTATION DEVICE

CROSS-REFERENCE TO RELATED APPLICATIONS

This application is the U.S. National Phase of PCT/JP2011/068328 filed Aug. 10, 2011, which claims priority of Japanese Patent Application 2010-181714 filed Aug. 16, 2010.

TECHNICAL FIELD

The present invention relates to a viewpoint location computation device that computes a viewpoint location of a driver of a vehicle.

BACKGROUND ART

In the related art, Patent Literature 1 is known as an example of a technical document of this technical field. Patent Literature 1 discloses a viewpoint location measurement device that measures a viewpoint location of a driver based on the angles of the rear-view mirror and side-view mirrors of a vehicle. In this viewpoint location measurement device, straight lines extending from the multiple mirrors to the viewpoint location of the driver are obtained based on the angles of the rear-view mirror and the side-view mirrors, and an intersection point between the obtained straight lines and a center plane of a driver's seat is measured as the viewpoint location.

CITATION LIST

Patent Literature

[Patent Literature 1] Japanese Unexamined Patent Application Publication No. 10-176928

SUMMARY OF INVENTION

Technical Problem

However, in the above-described viewpoint location measurement device, sufficient studies have not been done with regard to a case where the intersection points between the straight lines obtained from the multiple mirrors and the center plane of the driver's seat are not identical, and it cannot be said that the reliability of the measurement of the viewpoint location is high.

Therefore, an object of the present invention is to provide a viewpoint location computation device capable of improving the reliability associated with computation of the viewpoint location of a driver.

Solution to Problem

In order to solve the problem, according to an aspect of the present invention, there is provided a viewpoint location computation device that computes a viewpoint location of a driver of a vehicle, including: first estimated viewpoint location computation means for computing a first estimated viewpoint location of the driver based on an angle of a first vehicle-mounted mirror provided in the vehicle and a seating center location of the driver's seat of the vehicle; second estimated viewpoint location computation means for computing a second estimated viewpoint location of the driver based on an angle of a second vehicle-mounted mirror provided in the vehicle and the seating center location of the driver's seat of the vehicle; identical condition determination means for determining whether the first and second estimated viewpoint locations are identical; and viewpoint location computation means for computing the first or second estimated viewpoint location as the viewpoint location of the driver when the identical condition determination means determines that the first and second estimated viewpoint locations are identical, wherein when the identical condition determination means determines that the first and second estimated viewpoint locations are not identical, the viewpoint location computation means computes the viewpoint location of the driver based on the first and second estimated viewpoint locations.

According to the viewpoint location computation device of the above aspect of the present invention, the viewpoint location of the driver is computed based on the angles of the vehicle-mounted mirrors and the seating center location of the driver's seat based on the fact that the driver adjusts the angles of the vehicle-mounted mirrors according to the viewpoint location of the driver. Thus, it is possible to easily compute the viewpoint location of the driver without the need to equip a new device for detecting the viewpoint location. Moreover, in the viewpoint location computation device according to the above aspect of the present invention, when the estimated viewpoint locations obtained according to the respective vehicle-mounted mirrors are identical the estimated viewpoint location is computed as the viewpoint location, and when the estimated viewpoint locations are not identical the viewpoint location is computed based on the respective estimated viewpoint locations. Thus, according to this viewpoint location computation device, when the respective estimated viewpoint locations are not identical, the viewpoint location is computed appropriately rather than assuming that the first or second estimated viewpoint location is the viewpoint location. Therefore, it is possible to improve the reliability associated with computation of the viewpoint location of the driver.

Moreover, in an embodiment of the viewpoint location computation device according to the above aspect of the present invention, it is preferable that the viewpoint location computation device further includes third estimated viewpoint location computation means for computing a third estimated viewpoint location of the driver based on an angle of a third vehicle-mounted mirror provided in the vehicle and the seating center location of the driver's seat of the vehicle, wherein the identical condition determination means determines whether the first, second, and third estimated viewpoint locations are identical, and when the identical condition determination means determines that all of the estimated viewpoint locations are identical, the viewpoint location computation means computes the first, second, and third estimated viewpoint location as the viewpoint location of the driver, and when the identical condition determination means determines that any one of the first, second, and third estimated viewpoint locations is not identical to the other estimated viewpoint locations, the viewpoint location computation means computes the viewpoint location of the driver based on the first, second, and third estimated viewpoint locations.

According to the viewpoint location computation device according to the above embodiment of the present invention, the viewpoint location of the driver is computed based on the three estimated viewpoint locations respectively obtained based on the angles of the first to third vehicle-mounted mirrors. Thus, it is possible to further improve the reliability as compared to a case of computing the viewpoint location based on two estimated viewpoint locations.

Moreover, in another embodiment of the viewpoint location computation device according to the above aspect of the present invention, it is preferable that the first, second, and third vehicle-mounted mirrors may be a rear-view mirror of the vehicle, a right side-view mirror of the vehicle, and a left side-view mirror of the vehicle, respectively.

In this case, since the estimated viewpoint locations are computed from the rear-view mirror, the right side-view mirror, and the left side-view mirror which are necessary for checking a rearward visibility of the driver as the first to third vehicle-mounted mirrors, it is advantageous to improving the reliability.

Moreover, in another embodiment of the viewpoint location computation device according to the above aspect of the present invention, it is preferable that when the identical condition determination means determines that none of the estimated viewpoint locations are identical, the viewpoint location computation means computes a position on an inner side of a triangle of which the apexes are located at the first, second, and third estimated viewpoint locations as the viewpoint location.

According to the viewpoint location computation device according to the above embodiment of the present invention, even when none of the estimated viewpoint locations are identical, it is possible to compute the viewpoint location appropriately based on a positional relationship of the respective estimated viewpoint locations.

Moreover, in another embodiment of the viewpoint location computation device according to the above aspect of the present invention, it is preferable that the viewpoint location computation device further includes eye-range determination means for determining whether the estimated viewpoint location is present in a predetermined eye range, wherein when the eye-range determination means determines that two or more of the estimated viewpoint locations are present within the eye range, the identical condition determination means determines whether the estimated viewpoint locations that are determined to be present within the eye range are identical, and when the identical condition determination means determines that any one of the estimated viewpoint locations that are determined to be present within the eye range is not identical to the other estimated viewpoint location, the viewpoint location computation means computes the viewpoint location based on the estimated viewpoint locations that are determined to be present within the eye range.

According to the viewpoint location computation device according to the above embodiment of the present invention, the determination on identicalness and the computation of the viewpoint location are performed with respect to only the estimated viewpoint locations that are present in the predetermined eye range set to the vehicle. Thus, it is possible to prevent an estimated viewpoint location which is computed erroneously due to failure or the like from being computed as the viewpoint location and to improve the reliability associated with computation of the viewpoint location.

Moreover, in another embodiment of the viewpoint location computation device according to the above aspect of the present invention, it is preferable that the viewpoint location computation device further includes warning means for outputting a warning signal to the driver when the eye-range determination means determines that any one of the estimated viewpoint locations is not present within the eye range.

According to the viewpoint location computation device according to the above embodiment of the present invention, when any one of the estimated viewpoint locations is determined not to be present within the eye range, a warning signal is output to the driver since it is considered that the angle of any one of the vehicle-mounted mirrors or a driving posture of the driver is not proper. In this way, when the angle of the vehicle-mounted mirror or the driving posture of the driver is not proper, since it is possible to urge the driver to check the angle or the driving posture, it is possible to improve the driving safety of the vehicle.

Advantageous Effects of Invention

According to the present invention, it is possible to improve the reliability associated with computation of the viewpoint location of a driver.

DESCRIPTION OF EMBODIMENTS

Figure 1:
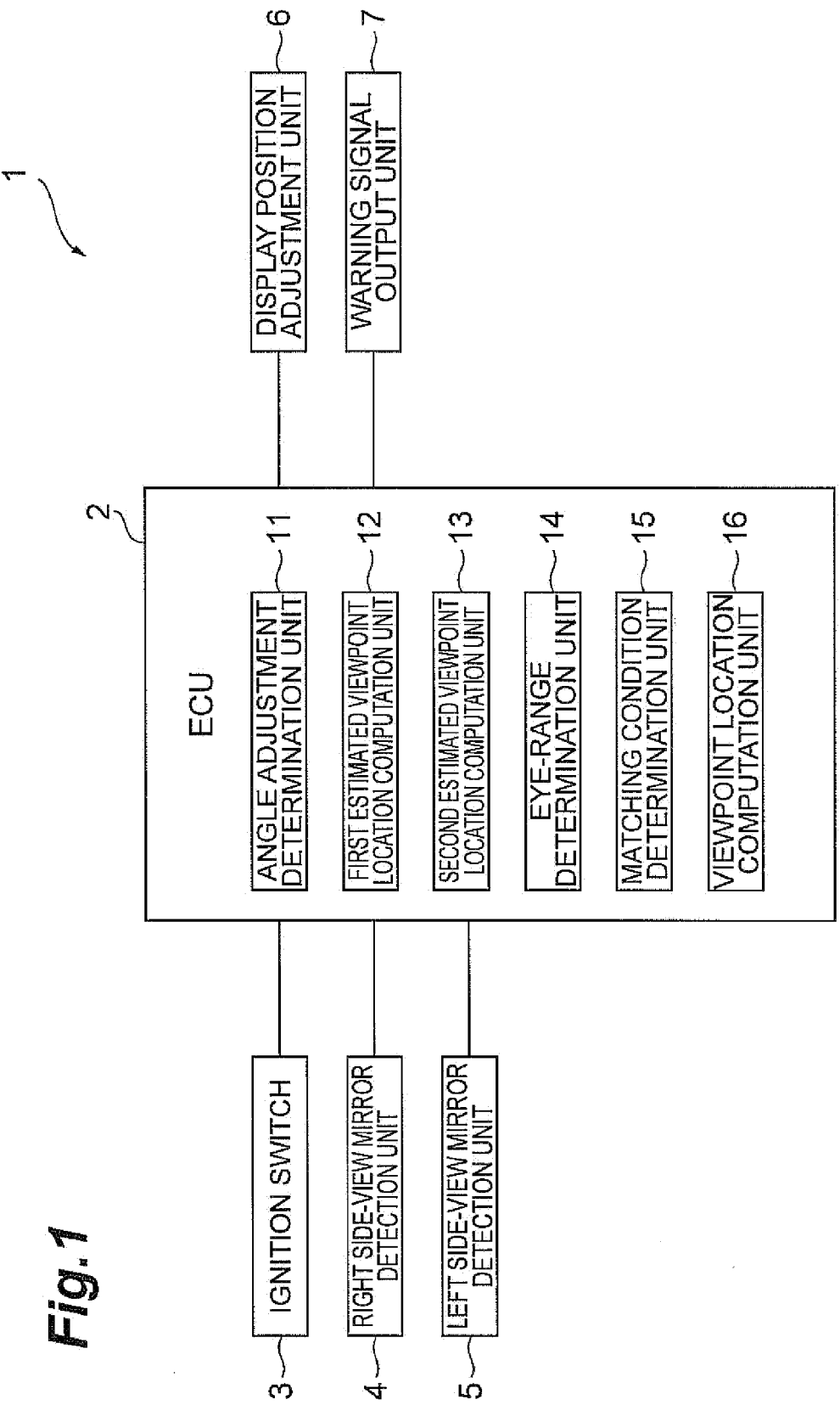
FIG. 1 is a block diagram illustrating a first embodiment of a viewpoint location computation device according to the present invention.

Hereinafter, preferred embodiments of the present invention will be described in detail with reference to the drawings.

In the drawings, the directions of a vehicle are expressed using an XYZ orthogonal coordinate system such that a front-to-rear direction of the vehicle is an X-axis, a width direction of the vehicle is a Y-axis, and a vertical direction of the vehicle is a Z-axis. Moreover, the same or the corresponding portions in the respective drawings will be denoted by the same reference numerals, and redundant description is not provided.

First Embodiment

Figure 2:
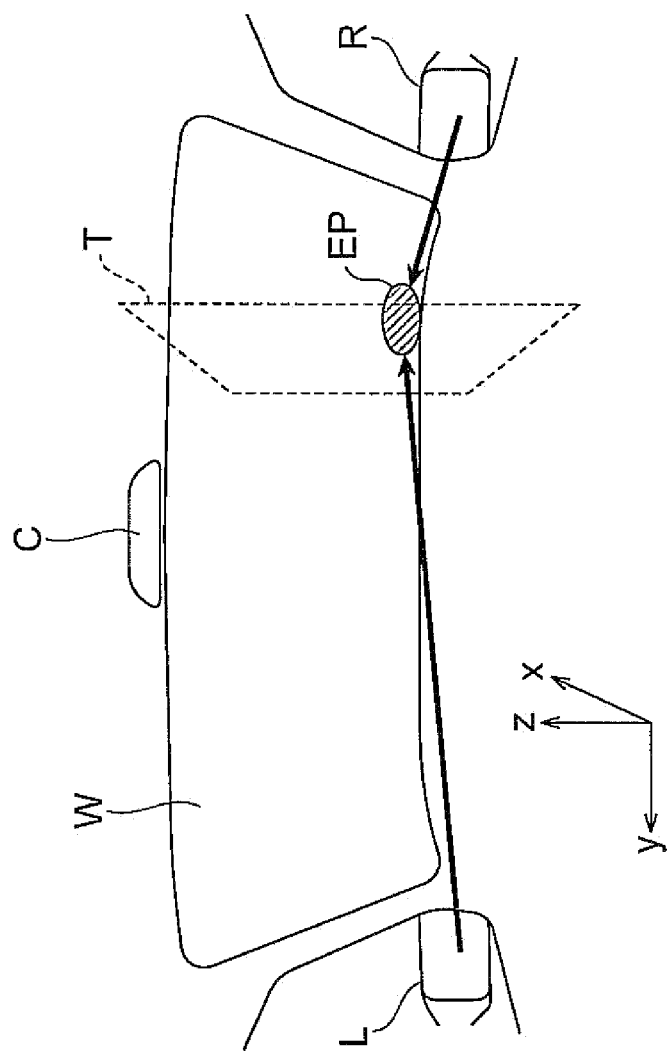
FIG. 2 is a schematic view for explaining computation of a viewpoint location by the viewpoint location computation device illustrated in FIG. 1.

As illustrated in FIGS. 1 and 2, a viewpoint location computation device 1 according to the first embodiment is configured to compute a viewpoint location EP of a driver based on the angles of a right side-view mirror R and a left side-view mirror L of a vehicle. The viewpoint location computation device 1 adjusts the display position of a head up display (HUD) 30 according to the computed viewpoint location EP. The right side-view mirror R and the left side-view mirror L respectively correspond to a first vehicle-mounted mirror and a second vehicle-mounted mirror described in the claims.

Figure 3:
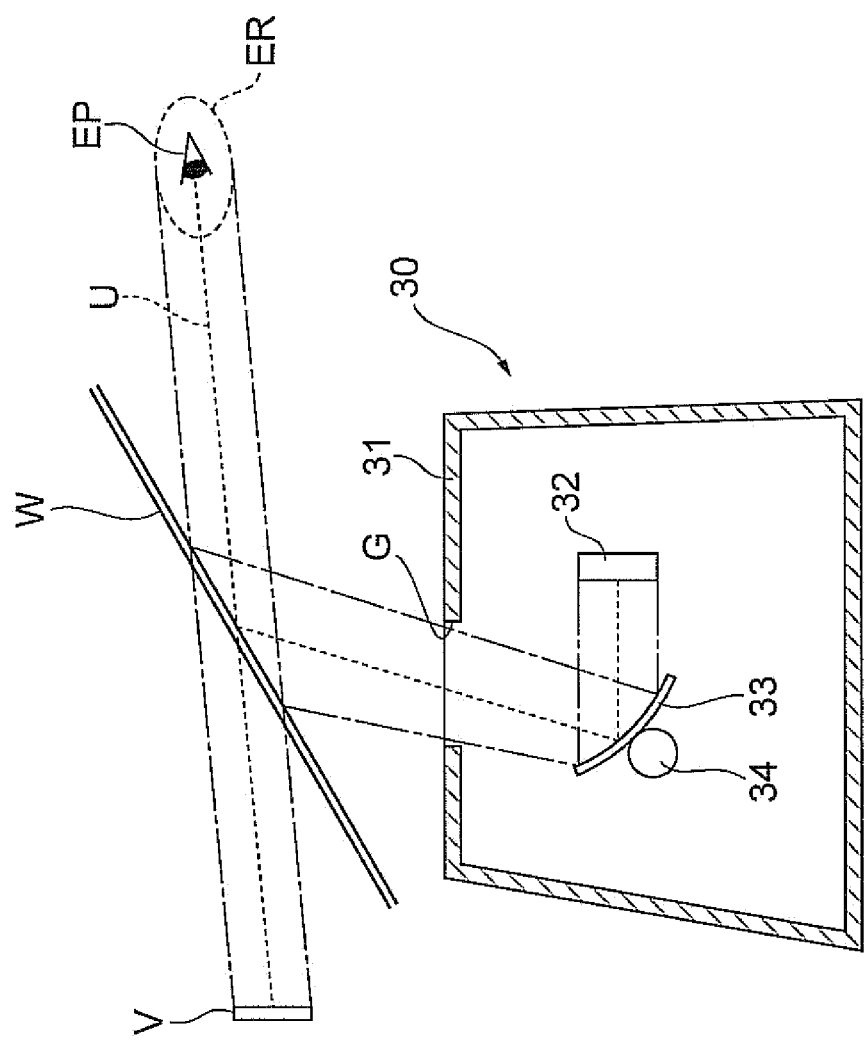
FIG. 3 is a schematic side view illustrating a configuration of a HUD.

As illustrated in FIG. 3, the HUD 30 is configured to display various items of information within the visual field of the driver by projecting a virtual image V overlapping a real scene onto a windshield W. The HUD 30 is an embed-type HUD that is embedded in the dashboard of the vehicle. The HUD 30 includes a housing 31 embedded in the dashboard, a display device 32 disposed in the housing 31, a reflecting member 33, and a reflecting member actuator 34. A gate G is formed in the housing 31 so that light output from the display device 32 strikes the windshield W. The HUD 30 forms a virtual image V by causing the light output from the display device 32 to be reflected toward the gate G by the reflecting member 33 and to strike the windshield W. An optical path of light that forms the virtual image V is denoted by a symbol U. The viewpoint location computation device 1 adjusts the display position of the virtual image V of the HUD 30 by controlling the reflecting member actuator 34 so as to change the angle or the position of the reflecting member 33. The HUD 30 is configured to be able to adjust the display position of the virtual image V in the horizontal direction as well as the vertical direction.

Hereinafter, computation of the viewpoint location EP the driver by the viewpoint location computation device 1 will be described.

Figure 4:
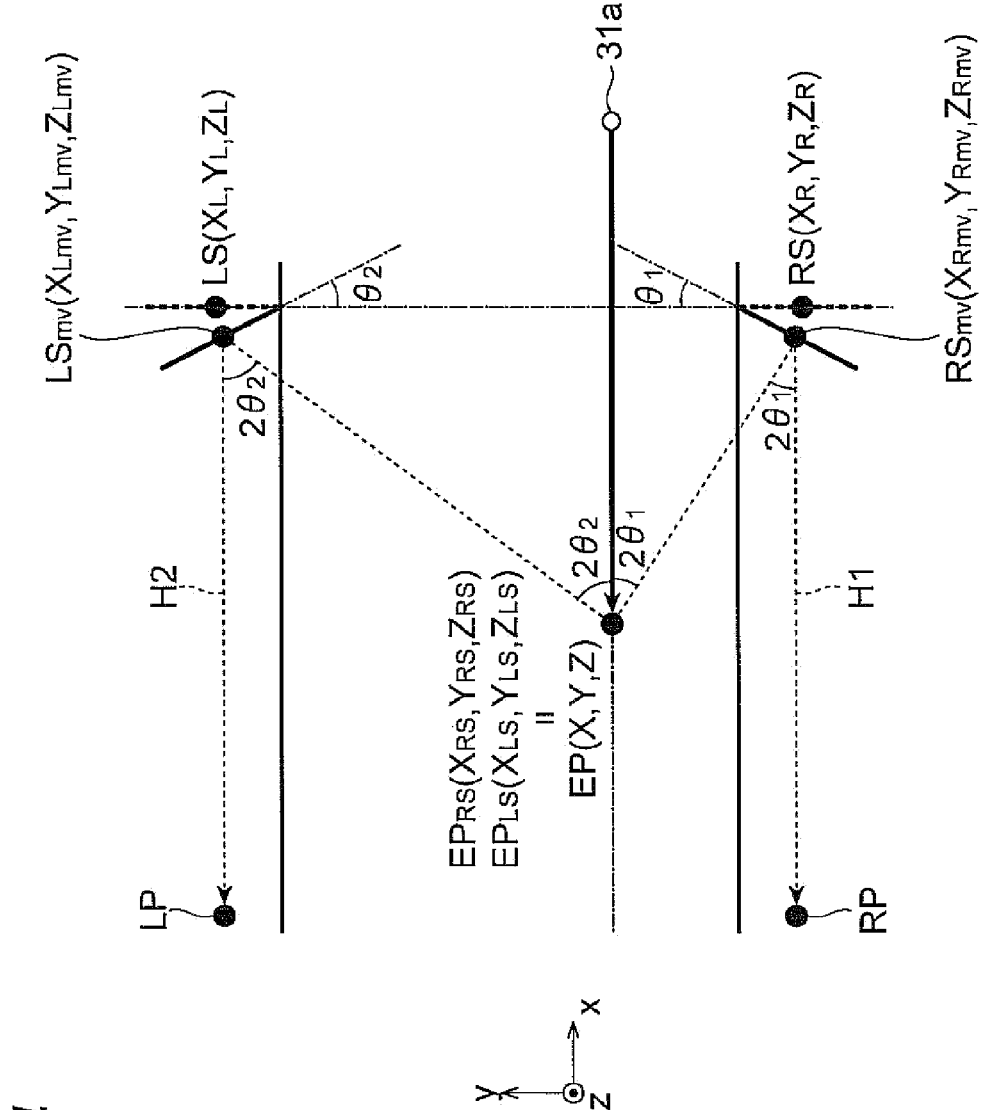
FIG. 4 is a schematic plan view for explaining computation of the viewpoint location.
Figure 5:
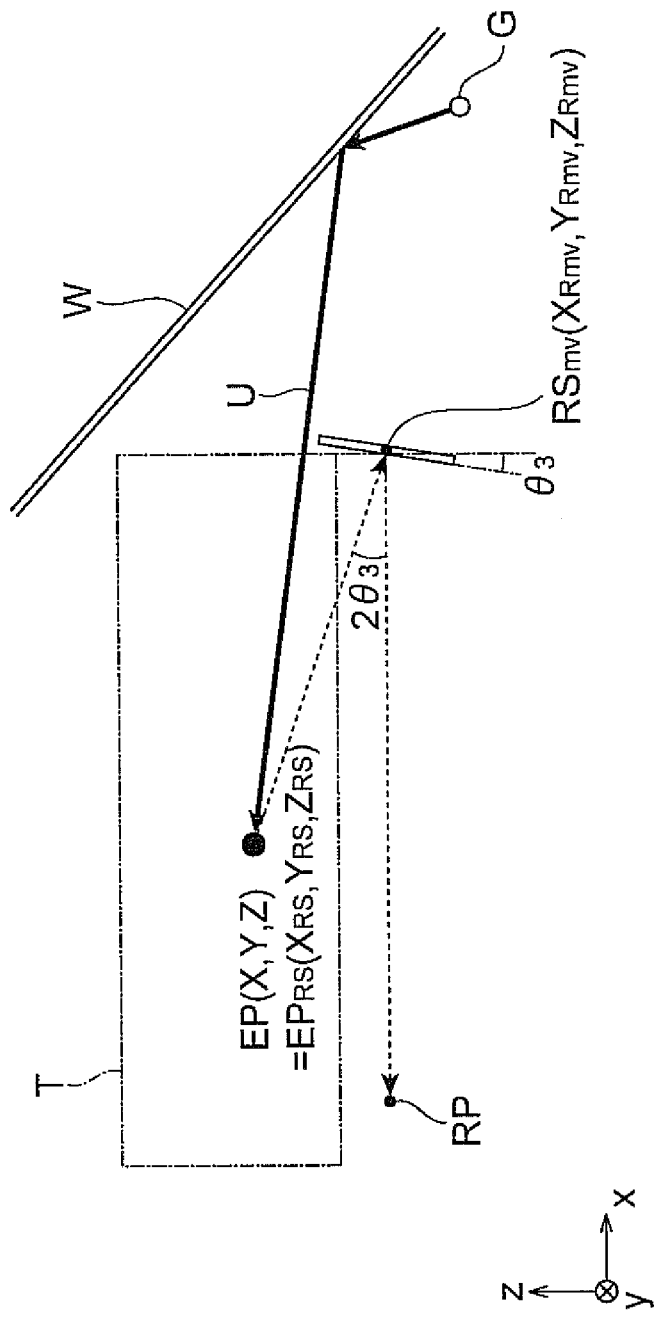
FIG. 5 is a schematic side view as seen from the right side of a vehicle, for explaining computation of the viewpoint location.

As illustrated in FIG. 2, the viewpoint location computation device 1 computes the viewpoint location EP of the driver based on the fact that the driver adjusts the angles of the side-view mirrors R and L so as to be able to see a predetermined check position. Here, as illustrated in FIGS. 4 and 5, a case where the driver adjusts the angle of the right side-view mirror R so as to be able to see a check position RP on the right rear side of the vehicle on the right side-view mirror R will be considered. In this case, light that moves from the check position RP on the right rear side of the vehicle toward the right side-view mirror R is reflected from the mirror surface of the right side-view mirror R to reach the viewpoint location EP of the driver. An optical path of this light is denoted by H1.

Moreover, due to the fact that drivers rarely drive in a horizontally tilted posture although drivers may drive in a crouched posture or in a posture of slightly leaning backward, the viewpoint location EP of the driver is considered to be present in a driver's seating center plane T which is the XZ-plane including the seating center location of the driver's seat. In this case, the viewpoint location EP of the driver is estimated to be identical to an intersection point between the optical path H1 and the driver's seating center plane T. Due to this, the viewpoint location computation device 1 computes a first estimated viewpoint location EPRS which is the intersection point between the driver's seating center plane T and the optical path H1 as a candidate for the viewpoint location EP.

Next, computation of the first estimated viewpoint location EPRS by the viewpoint location computation device 1 will be described. The coordinates of respective positions are represented using the gate G of the HUD 30 as the coordinate origin.

As illustrated in FIG. 4, a state where the right side-view mirror R is erected to be in parallel with the YZ-plane is set as the initial state of the right side-view mirror R of the vehicle, and the center position RS of the mirror surface of the right side-view mirror R in the initial state is expressed as a coordinate (XR, YR, ZR). Moreover, the center position RSmv of the mirror surface of the right side-view mirror R after the angular adjustment of the driver is expressed as a coordinate (XRmv, YRmv, ZRmv).

Here, a geometric relationship in the XY-plane will be discussed. When the angle changed from the initial state of the right side-view mirror R in the XY-plane is θ1, XRmv and YRmv in the coordinate of the center position RSmv of the right side-view mirror R after the angular adjustment are expressed as Equations (1) and (2) below.

[Mathematical Formula 1]

$$X_{Rmv} = X_R \cdot \cos\theta_1 - Y_R \cdot \sin\theta_1 \quad (1)$$

$$Y_{Rmv} = X_R \cdot \sin\theta_1 + Y_R \cdot \cos\theta_1 \quad (2)$$

In this case, the optical path H1 that connects the check position RP on the right rear side of the vehicle, the center position RSmv of the right side-view mirror R, and the viewpoint location EP of the driver have a geometric relationship as illustrated in FIG. 4 as seen from the axial direction Z. That is, the magnitude of an angle that the optical path H1 forms in the XY-plane with respect to the center position RSmv of the right side-view mirror R as an apex is equal to twice θ1. Due to this, XRS in a coordinate (XRS, YRS, ZRS) of the first estimated viewpoint location EPRS which is the intersection point between the optical path H1 and the driver's seating center plane T is expressed as Equation (3) below using Equations (1) and (2).

[Mathematical Formula 2]

$$Y_{RS} = X_{Rmv} + (Y - Y_{Rmv})/\tan 2\theta_1 = X_{Rmv} + (y_0 - Y_{Rmv})/\tan 2\theta_1 \quad (3)$$

Moreover, since the first estimated viewpoint location EPRS is present on the driver's seating center plane T, if the Y-coordinate of the driver's seating center plane T is y0, YRS which is the Y-coordinate of the first estimated viewpoint location EPRS is equal to y0.

Next, a geometric relationship in the XZ-plane will be discussed. As illustrated in FIG. 5, when the angle changed from the initial state of the right side-view mirror R in the XZ-plane is θ3, XRmv and ZRmv in the coordinate of the center position RSmv of the right side-view mirror R after the angular adjustment are expressed as Equations (4) and (5) below.

[Mathematical Formula 3]

$$X_{Rmv} = X_R \cdot \cos\theta_3 - Z_R \cdot \sin\theta_3 \quad (4)$$

$$Z_{Rmv} = X_R \cdot \sin\theta_3 + Z_R \cdot \cos\theta_3 \quad (5)$$

In this case, the optical path H1 has a geometric relationship as illustrated in FIG. 5 as seen from the axial direction Y, and the magnitude of an angle that the optical path H1 forms in the XZ-plane with respect to the center position RSmv of the right side-view mirror R as an apex is equal to twice of θ3. Thus, ZRS which is the Z-coordinate of the first estimated viewpoint location EPRS is expressed as Equation (6) below using Equations (4) and (5).

[Mathematical Formula 4]

$$Z_{RS}=Z_{Rmv}+(X-X_{Rmv})/\tan 2\theta_1 \quad (6)$$

The coordinate (XRS, YRS, ZRS) of the first estimated viewpoint location EPRS is obtained from Equations (3) and (6) and the Y-coordinate y0 of the driver's seating center plane T.

Next, computation of the second estimated viewpoint location EPLS by the viewpoint location computation device 1 will be described. The second estimated viewpoint location EPLS is a candidate for the viewpoint location EP computed based on the angle of the left side-view mirror L of the vehicle.

As illustrated in FIG. 4, the center position LS of the mirror surface of the left side-view mirror L of the vehicle in the initial state is expressed as a coordinate (XL, YL, ZL). Moreover, the center position LSmv of the mirror surface of the left side-view mirror L after the angular adjustment of the driver is expressed as a coordinate (XLmv, YLmv, ZLmv).

Similar to the case of the right side-view mirror R, when the angle changed from the initial state of the left side-view mirror L in the XY-plane is $\theta_2$, XLmv and YLmv in the coordinate of the center position LSmv of the left side-view mirror L after the angular adjustment are expressed as Equations (7) and (8) below from the geometric relationship illustrated in FIG. 4.

[Mathematical Formula 5]

$$X_{Lmv}=X_L \cdot \cos\theta_2 - Y_L \cdot \sin\theta_2 \quad (7)$$

$$Y_{Lmv}=X_L \cdot \sin\theta_2 + Y_L \cdot \cos\theta_2 \quad (8)$$

In this case, an optical path H2 that connects the check position LP on the left rear side of the vehicle, the center position LSmv of the left side-view mirror L, and the viewpoint location EP of the driver has the geometric relationship as shown in FIG. 4 as seen from the axial direction Z. That is, the magnitude of an angle that the optical path H2 forms in the XY-plane with respect to the center position LSmv of the left side-view mirror L as an apex is equal to twice of $\theta_2$. Due to this, XLS of the coordinate (XLS, YLS, ZLS) of the second estimated viewpoint location EPLS which is the intersection point between the optical path H2 and the driver's seating center plane T is expressed as Equation (9) using Equations (7) and (8).

[Mathematical Formula 6]

$$X_{LS}=X_{Lmv}+(Y-Y_{Lmv})/\tan 2\theta_2 = X_{Lmv}+(y_0-Y_{Lmv})/\tan 2\theta_2 \quad (9)$$

Moreover, since the second estimated viewpoint location EPLS is present on the driver's seating center plane T, when the Y-coordinate of the driver's seating center plane T is y0, YLS which is the Y-coordinate of the second estimated viewpoint location EPLS is obtained as y0.

Figure 6:
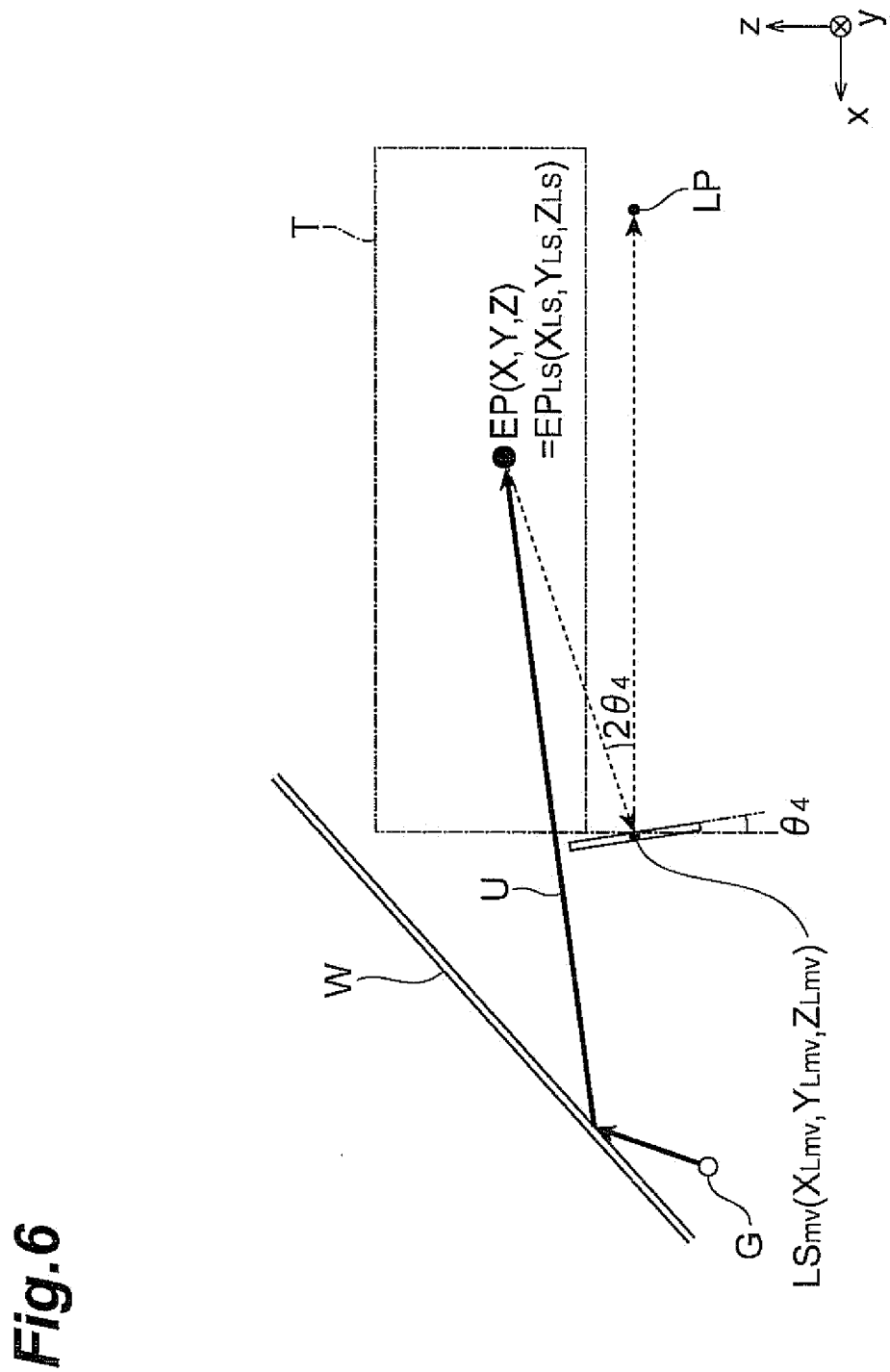
FIG. 6 is a schematic side view as seen from the left side of a vehicle, for explaining computation of the viewpoint location.

Next, a geometric relationship in the XZ-plane will be discussed. As illustrated in FIG. 6, when the angle changed of the left side-view mirror L in the XZ-plane is θ4, XLmv and ZLmv in the coordinate of the center position LSmv of the left side-view mirror L after the angular adjustment is expressed as Equations (10) and (11) below.

[Mathematical Formula 7]

$$X_{Lmv}=X_L \cdot \cos\theta_4 - Z_L \cdot \sin\theta_4 \quad (10)$$

$$Z_{Lmv}=X_L \cdot \sin\theta_4 + Z_L \cdot \cos\theta_4 \quad (11)$$

The optical path H2 has a geometric relationship as illustrated in FIG. 6 as viewed from the axial direction Y, and the magnitude of an angle that the optical path H2 forms in the XZ-plane with respect to the center position LSmv of the left side-view mirror L as an apex is equal to twice of θ4. Thus, the Z-coordinate of the second estimated viewpoint location EPLS is expressed as Equation (12) below using Equations (10) and (11).

[Mathematical Formula 8]

$$Z_{LS}=L_{Lmv}+(X-X_{Lmv})/\tan 2\theta_4 \quad (12)$$

The coordinate (XLS, YLS, ZLS) of the second estimated viewpoint location EPLS is obtained from Equations (9) and (12) and the Y-coordinate y0 of the driver's seating center plane T.

Figure 7:
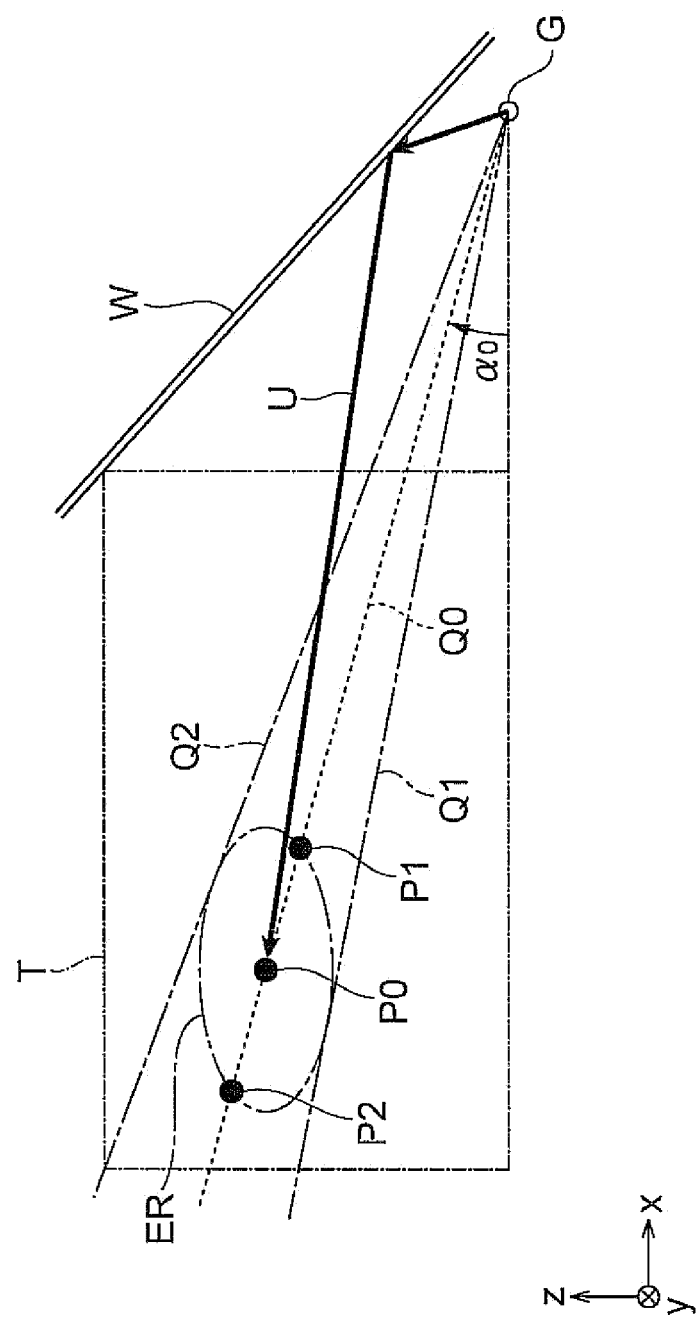
FIG. 7 is a schematic side view for explaining an eye range.

The viewpoint location computation device 1 determines whether the computed first and second estimated viewpoint locations EPRS and EPLS are present within an eye range ER illustrated in FIGS. 3 and 7. The eye range ER is a range that is determined in advance as a range where the viewpoint locations EP of most drivers are included, excluding a driver who poses a peculiar driving posture and has an unordinary body size. The HUD 30 provided in the vehicle is designed so that the driver can appropriately see the virtual image V which is projected from a viewpoint in the eye range ER to the windshield W.

As illustrated in FIG. 7, the eye range ER in the driver's seating center plane T can be expressed as a predetermined allowable elevation angle range α1 to α2 from the gate G (coordinate origin) of the HUD 30. Here, α1 is a minimum elevation angle corresponding to the eye range ER. A normal line at the elevation angle α1 is denoted by Q1. Moreover, α2 is a maximum elevation angle corresponding to the eye range ER. A normal line at the elevation angle α2 is denoted by Q2. In this case, an elevation angle α at a certain coordinate (s, t, u) is obtained by Equation (13) with the coordinate origin set as (X0, Y0, Z0).

[Mathematical Formula 9]

$$\alpha = \sin^{-1}\frac{\sqrt{(s-X_0)^2+(u-Z_0)^2}}{u-Z_0} \quad (13)$$

The viewpoint location computation device 1 computes the elevation angles β and γ at the computed first and second estimated viewpoint locations EPRS and EPLS and determines whether these elevation angles β and γ fall within the allowable elevation angle range α1 to α2 of the eye range ER.

When the elevation angles β and γ are determined to fall within the allowable elevation angle range α1 to α2 of the eye range ER, the viewpoint location computation device 1 determines that the first and second estimated viewpoint locations EPRS and EPLS are present within the eye range ER. When the elevation angles β and γ are determined not to fall within the allowable elevation angle range α1 to α2 of the eye range ER, the viewpoint location computation device 1 determines that the first and second estimated viewpoint locations EPRS and EPLS are not present within the eye range ER.

When the first or second estimated viewpoint location EPRS or EPLS is determined not to be present within the eye range ER, the viewpoint location computation device 1 determines that the angle of the side-view mirror R or L or the driving posture of the driver is not proper and issues a warning signal to the driver.

When the first and second estimated viewpoint locations EPRS and EPLS are determined to be present within the eye range ER, the viewpoint location computation device 1 determines whether the first and second estimated viewpoint locations EPRS and EPLS are identical. An identical condition is satisfied when the distance between the respective estimated viewpoint locations is a predetermined value or smaller. The predetermined value is appropriately set according to the computational accuracy or the like of the device in order to secure computational accuracy of the viewpoint location.

As illustrated in FIGS. 4 to 6, when the first and second estimated viewpoint locations EPRS and EPLS are identical, the viewpoint location computation device 1 computes the first or second estimated viewpoint location EPRS or EPLS as the viewpoint location EP of the driver. That is, the viewpoint location computation device 1 computes the coordinate (XRS, YRS, ZRS) of the first estimated viewpoint location EPRS or the coordinate (XLS, YLS, ZLS) of the second estimated viewpoint location EPLS as the coordinate (X, Y, Z) of the viewpoint location EP.

Figure 8:
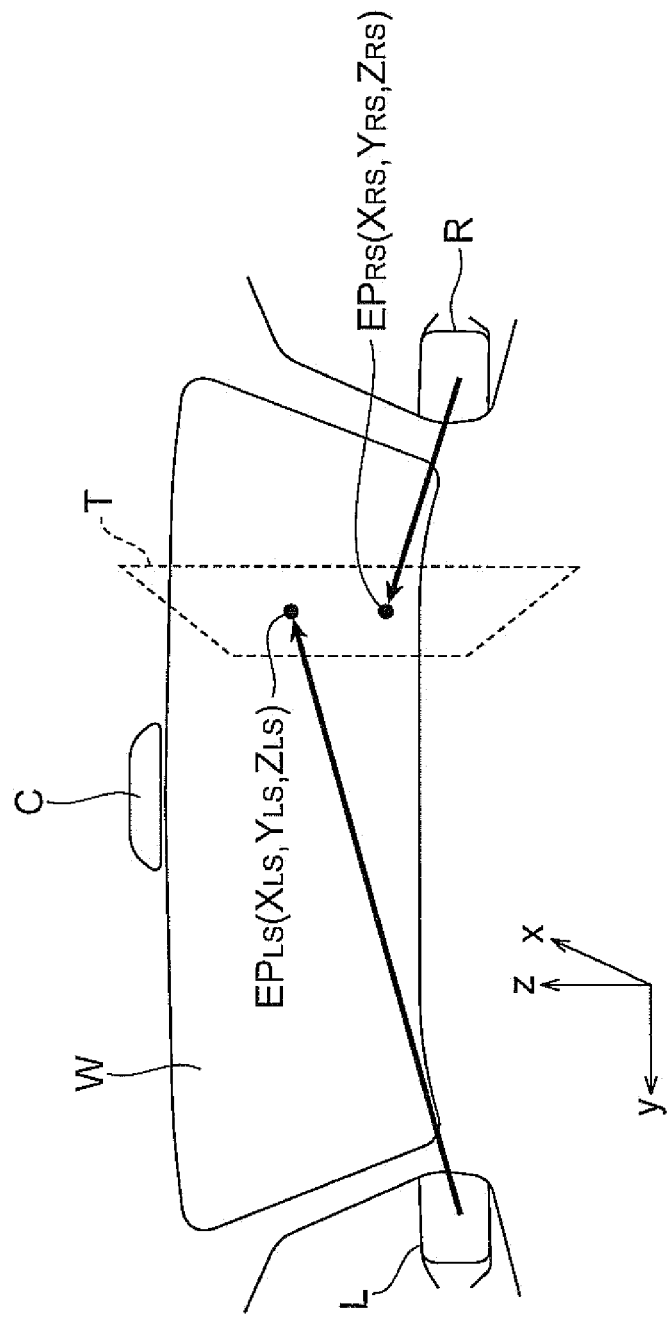
FIG. 8 is a schematic view for explaining a case where estimated viewpoint locations are not identical.
Figure 9:
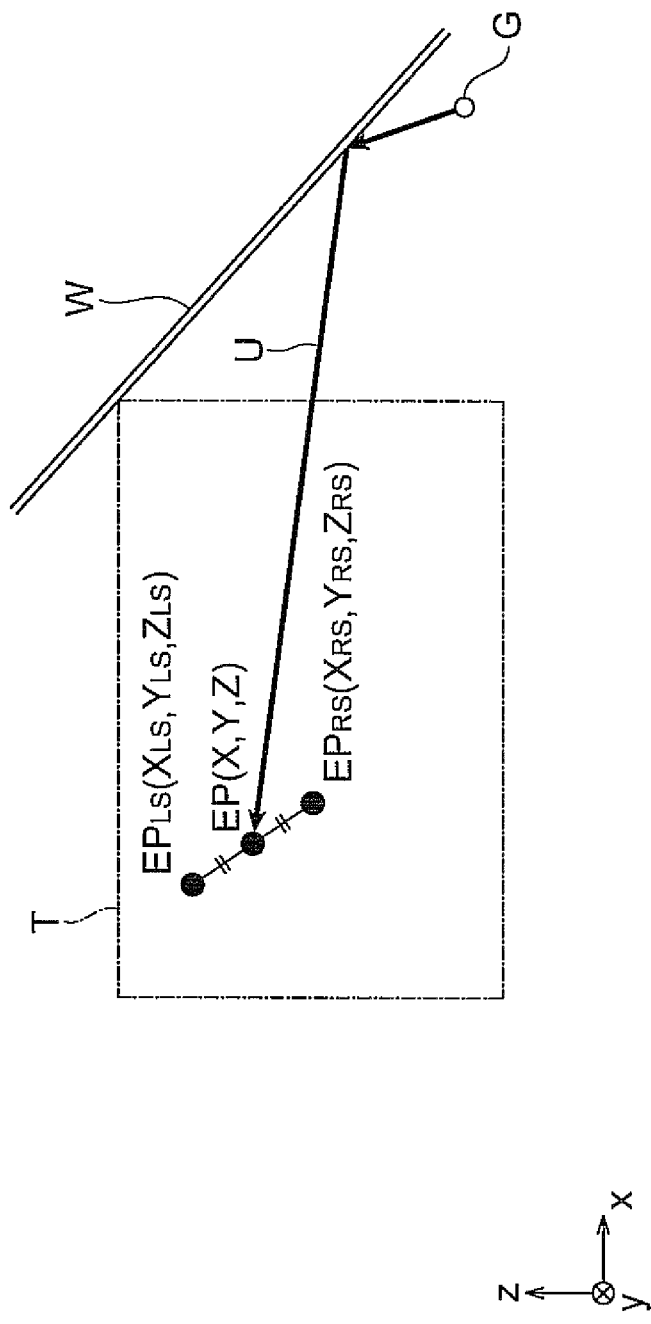
FIG. 9 is a schematic side view for explaining computation of the viewpoint location when estimated viewpoint locations are not identical.

Moreover, as illustrated in FIGS. 8 and 9, when the first and second estimated viewpoint locations EPRS and EPLS are not identical, the viewpoint location computation device 1 computes a midpoint position at the same distance from the first and second estimated viewpoint locations EPRS and EPLS as the viewpoint location EP of the driver. In this case, the coordinate (X, Y, Z) of the viewpoint location EP is obtained from Equations (14) to (16) below.

[Mathematical Formula 10]

$$X=(X_{RS}-X_{LS})/2 \quad (14)$$

$$Y=y_0 \quad (15)$$

$$Z=(Z_{RS}-Z_{LS})/2 \quad (16)$$

Next, the configuration of the above-described viewpoint location computation device 1 will be described.

As illustrated in FIG. 1, the viewpoint location computation device 1 according to the first embodiment includes an electronic control unit (ECU) 2 that controls an overall operation of the device. The ECU 2 is an electronic control unit including a central processing unit (CPU), a read only memory (ROM), and a random access memory (RAM). The ECU 2 is electrically connected to an ignition switch 3, a right side-view mirror detection unit 4, a left side-view mirror detection unit 5, a display position adjustment unit 6, and a warning signal output unit 7.

The ignition switch 3 is a switch for allowing the driver to start the engine of the vehicle. When the ignition switch 3 is turned on, the viewpoint location computation device 1 starts in synchronization with the start of the vehicle engine. When the ignition switch 3 is turned off, the viewpoint location computation device 1 also stops.

The right side-view mirror detection unit 4 detects the angle of the right side-view mirror R of the vehicle. The right side-view mirror detection unit 4 outputs a right side-view mirror angle signal that indicates the detected angle of the right side-view mirror R to the ECU 2. The left side-view mirror detection unit 5 detects the angle of the left side-view mirror L of the vehicle. The left side-view mirror detection unit 5 outputs a left side-view mirror angle signal that indicates the detected angle of the left side-view mirror L to the ECU 2.

The display position adjustment unit 6 drives the reflecting member actuator 34 of the HUD 30 to adjust the display position of the virtual image V of the HUD 30. The display position adjustment unit 6 adjusts the display position of the HUD 30 according to a command from the ECU 2. The warning signal output unit 7 outputs an audible warning message to the driver. The warning signal output unit 7 outputs an audible warning message of a predetermined content according to the command from the ECU 2. The warning signal output unit 7 functions as warning means described in the claims.

The ECU 2 includes an angle adjustment determination unit 11, a first estimated viewpoint location computation unit 12, a second estimated viewpoint location computation unit 13, an eye-range determination unit 14, a matching or identical condition determination unit 15, and a viewpoint location computation unit 16.

The angle adjustment determination unit 11 determines whether the angles of the side-view mirrors are adjusted based on the right side-view mirror angle signal of the right side-view mirror detection unit 4 and the left side-view mirror angle signal of the left side-view mirror detection unit 5.

When the angle adjustment determination unit 11 determines that the angle of the right side-view mirror R is adjusted, the first estimated viewpoint location computation unit 12 updates the information on the angle of the right side-view mirror R based on the right side-view mirror angle signal. The first estimated viewpoint location computation unit 12 computes the first estimated viewpoint location EPRS based on the angle of the right side-view mirror R and the driver's seating center plane T. The first estimated viewpoint location computation unit 12 computes the elevation angle β of the first estimated viewpoint location EPRS with respect to the gate G of the HUD 30. The first estimated viewpoint location computation unit 12 functions as first estimated viewpoint location computation means described in the claims.

When the angle adjustment determination unit 11 determines that the angle of the left side-view mirror L is adjusted, the second estimated viewpoint location computation unit 13 updates the information on the angle of the left side-view mirror L based on the left side-view mirror angle signal. The second estimated viewpoint location computation unit 13 computes the second estimated viewpoint location EPLS based on the angle of the left side-view mirror L and the driver's seating center plane T. The second estimated viewpoint location computation unit 13 computes the elevation angle γ of the second estimated viewpoint location EPLS with respect to the gate G of the HUD 30. The second estimated viewpoint location computation unit 13 functions as second estimated viewpoint location computation means described in the claims.

The eye-range determination unit 14 determines whether the first and second estimated viewpoint locations EPRS and EPLS are present in the predetermined eye range ER. Specifically, the eye-range determination unit 14 determines whether the elevation angle β of the first estimated viewpoint location EPRS and the elevation angle γ of the second estimated viewpoint location EPLS fall within the allowable elevation angle range α1 to α2 of the eye range ER to thereby determine whether the respective estimated viewpoint locations are present within the eye range ER. When any one of the first and second estimated viewpoint locations EPRS and EPLS is determined not to be present within the eye range ER, the eye-range determination unit 14 outputs a warning signal output command to the warning signal output unit 7. The eye-range determination unit 14 functions as eye-range determination means described in the claims.

When the eye-range determination unit 14 determines that the first and second estimated viewpoint locations EPRS and EPLS are present within the eye range ER, the identical condition determination unit 15 determines whether the first and second estimated viewpoint locations EPRS and EPLS are identical. The identical condition determination unit 15 functions as identical condition determination means described in the claims.

When the identical condition determination unit 15 determines that the first and second estimated viewpoint locations EPRS and EPLS are identical, the viewpoint location computation unit 16 computes the first or second estimated viewpoint location EPRS or EPLS as the viewpoint location EP of the driver. When the identical condition determination unit 15 determines that the first and second estimated viewpoint locations EPRS and EPLS are not identical, the viewpoint location computation unit 16 computes the midpoint position between the first and second estimated viewpoint locations EPRS and EPLS as the viewpoint location EP of the driver. The viewpoint location computation unit 16 functions as viewpoint location computation means described in the claims.

When the viewpoint location EP is computed, the viewpoint location computation unit 16 determines whether the computed viewpoint location EP and the previous viewpoint location of the driver stored therein are identical. When the computed viewpoint location EP and the previous viewpoint location are determined to be identical, the viewpoint location computation unit 16 ends the process. On the other hand, when the computed viewpoint location EP and the previous viewpoint location are determined not to be identical, the viewpoint location computation unit 16 updates the information on the viewpoint location of the driver based on the computed viewpoint location EP.

The viewpoint location computation unit 16 sends a display position adjustment command corresponding to the updated viewpoint location EP to the display position adjustment unit 6. Specifically, the viewpoint location computation unit 16 computes the elevation angle $\alpha 0$ (see FIG. 7) of the viewpoint location EP with respect to the gate G of the HUD 30 and sends the display position adjustment command corresponding to the elevation angle $\alpha 0$ of the viewpoint location EP to the display position adjustment unit 6.

Here, adjustment control of the display position of the virtual image V of the HUD 30 by the display position adjustment unit 6 will be described with reference to FIGS. 7 and 10. The display position adjustment unit 6 identifies the elevation angle $\alpha 0$ of the viewpoint location EP from the display position adjustment command sent from the viewpoint location computation unit 16. The display position adjustment unit 6 adjusts the display position of the virtual image V of the HUD 30 based on the elevation angle $\alpha 0$ of the viewpoint location EP.

In this case, the normal line Q0 of the elevation angle $\alpha 0$ includes a closest point P1 and a furthest point P2 which are respectively points closest to and furthest from the reference point (the gate G) in the eye range ER. The furthest point P2 is slightly higher than the closest point P1. In the eye range ER on the normal line Q0, since the closer the viewpoint location EP located closer to the center between the closest point P1 and the furthest point P2, the higher the probability of presence of the viewpoint location EP, the display position of the virtual image V is adjusted by assuming that a representative point P0 projected on the normal line Q0 of the elevation angle $\alpha 0$ is the viewpoint location of the driver. That is, when the actual viewpoint location EP is present in a position between the closest point P1 and the furthest point P2, the display position adjustment unit 6 adjusts the display position by assuming that the viewpoint location EP is present at the representative point P0 regardless of the actual viewpoint location EP.

Figure 10:
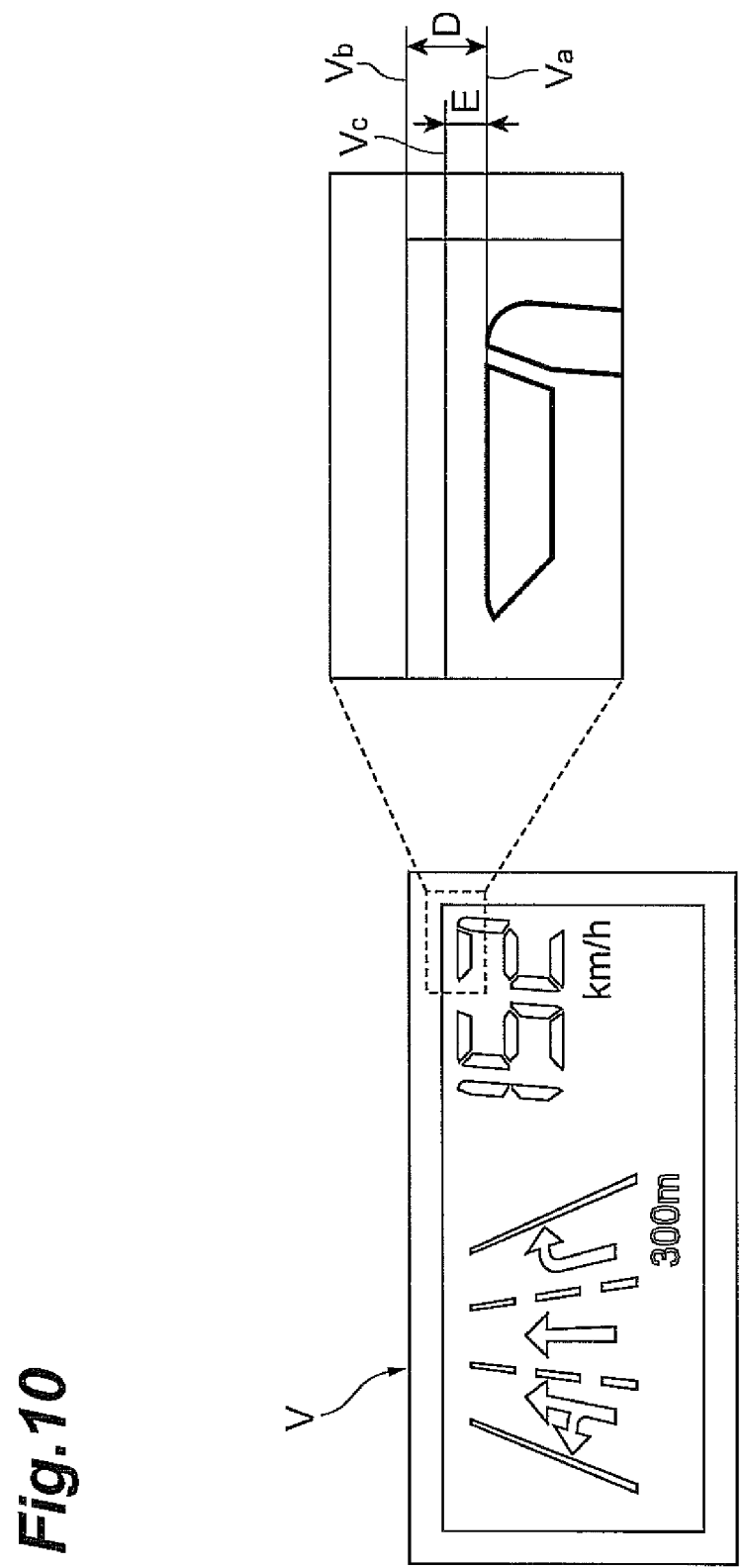
FIG. 10 is a view illustrating a virtual image of the HUD.

Moreover, as illustrated in FIG. 10, a margin is generally provided between the outermost outline (drawing range) of the virtual image V and a visible range of the virtual image V. This margin is set in order to ensure that the virtual image V does not deviate from the visual field of the driver even when the viewpoint location EP of the driver varies temporarily due to vibration or the like of the vehicle. In FIG. 10, in the virtual image V adjusted based on the assumption that the viewpoint location EP is present at the representative point P0, a difference between a drawing range upper end Va and a visible range upper end Vb observed from the representative point P0 is denoted by D. Moreover, a difference between the drawing range upper end Va and the visible range upper end Vc at the furthest point P2 is denoted by E. In this case, an optical margin or the size of the virtual image V is designed within a range such that the difference D is greater than the difference E. In this way, the display position is adjusted so that the virtual image V is always visible from the viewpoint location EP that is positioned on the normal line Q0 of the elevation angle $\alpha 0$. Since this margin decreases from D to the difference between D and E, by securing this distance as a necessary design margin, favorable visibility is secured at the furthest point P2. That is, by appropriately designing a visibility margin from the closest point P1 and the furthest point P2 in the eye range ER into the virtual image V and the visible range with respect to the gate G of the HUD 30, it is possible to realize control such that the position of the virtual image V is maintained in such a range that the virtual image V is always visible.

Next, the process of the above-described viewpoint location computation device 1 will be described with reference to the drawings.

Figure 11:
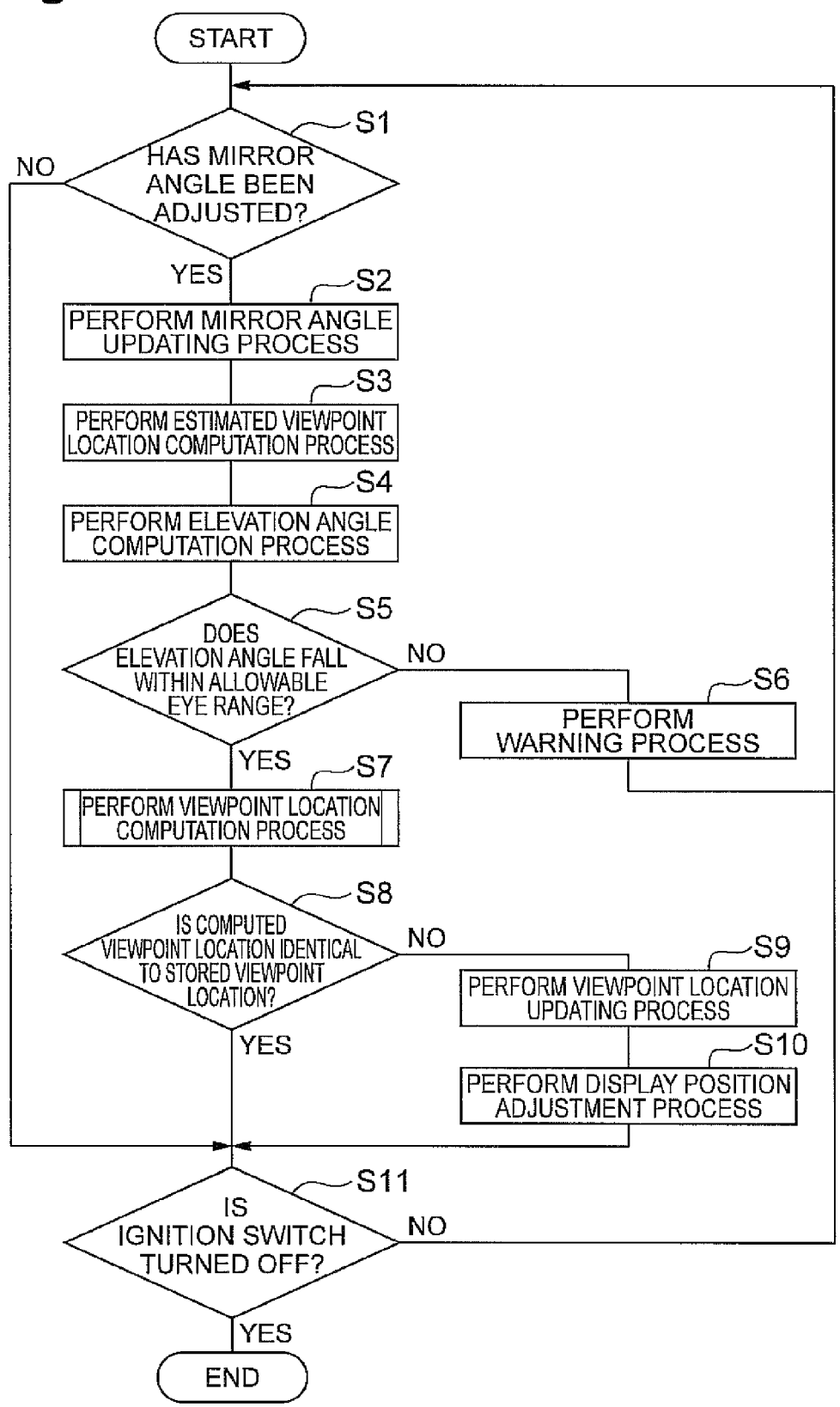
FIG. 11 is a flowchart illustrating the flow of the process of the viewpoint location computation device according to the first embodiment.

As illustrated in FIG. 11, when the ignition switch 3 is turned on, and the device starts, the angle adjustment determination unit 11 of the viewpoint location computation device 1 determines whether the angle of any one of the side-view mirrors is adjusted based on the right side-view mirror angle signal of the right side-view mirror detection unit 4 and the left side-view mirror angle signal of the left side-view mirror detection unit 5 (S1). When the angle adjustment determination unit 11 determines that the angle of the side-view mirror is not adjusted, the flow proceeds to step S11.

When the angle adjustment determination unit 11 determines that the angle of the side-view mirror is adjusted, a mirror angle updating process of step S2 is performed. In the mirror angle updating process, when the angle adjustment determination unit 11 determines that the angle of the right side-view mirror R is adjusted, the first estimated viewpoint location computation unit 12 updates the information on the angle of the right side-view mirror R based on the right side-view mirror angle signal. Similarly, when the angle adjustment determination unit 11 determines that the angle of the left side-view mirror L is adjusted, the second estimated viewpoint location computation unit 13 updates the information on the angle of the left side-view mirror L based on the left side-view mirror angle signal.

Subsequently, an estimated viewpoint location computation process of step S3 is performed. In the estimated viewpoint location computation process, when the mirror angle updating process is performed, the first estimated viewpoint location computation unit 12 computes the first estimated viewpoint location EPRS based on the angle of the right side-view mirror R and the driver's seating center plane T. Similarly, the second estimated viewpoint location computation unit 13 computes the second estimated viewpoint location EPLS based on the angle of the left side-view mirror L updated in the mirror angle updating process and the driver's seating center plane T.

Subsequently, an elevation angle computation process of step S4 is performed. In the elevation angle computation process, the first estimated viewpoint location computation unit 12 computes the elevation angle β of the first estimated viewpoint location EPRS computed in the estimated viewpoint location computation process. Similarly, the second estimated viewpoint location computation unit 13 computes the elevation angle γ of the second estimated viewpoint location EPLS computed in the estimated viewpoint location computation process.

Subsequently, the eye-range determination unit 14 determines whether the elevation angle β of the first estimated viewpoint location EPRS and the elevation angle γ of the second estimated viewpoint location EPLS fall within the allowable elevation angle range α1 to α2 of the eye range ER (S5). When any one of the elevation angles β and γ is determined not to fall within the allowable elevation angle range α1 to α2 of the eye range ER, the eye-range determination unit 14 determines that the first or second estimated viewpoint location EPRS and EPLS is not present within the eye range ER and performs a warning process of sending a warning signal output command to the warning signal output unit 7 (S6). The warning signal output unit 7 outputs an audible warning message corresponding to the warning signal output command to the driver.

When the eye-range determination unit 14 determines that the first and second estimated viewpoint locations EPRS and EPLS are present within the eye range ER, a viewpoint location computation process of computing the viewpoint location EP of the driver based on the respective estimated viewpoint locations is performed (S7). The viewpoint location computation process will be described later.

When the viewpoint location EP is computed, the viewpoint location computation unit 16 determines whether the computed viewpoint location EP is identical to the previous viewpoint location of the driver stored therein (S8). When the viewpoint location computation unit 16 determines that the computed viewpoint location EP is identical to the previous viewpoint location of the driver, the flow proceeds to step S11.

On the other hand, when the computed viewpoint location EP is determined not to be identical to the previous viewpoint location of the driver, the viewpoint location computation unit 16 updates the information on the viewpoint location of the driver based on the computed viewpoint location EP (S9). The viewpoint location computation unit 16 sends a display position adjustment command corresponding to the updated viewpoint location EP to the display position adjustment unit 6 (S10). The display position adjustment unit 6 adjusts the display position of the virtual image V of the HUD 30 according to the display position adjustment command.

In step S11, it is determined whether the ignition switch 3 is turned off. When the ignition switch 3 is not turned off, the viewpoint location computation device 1 repeatedly performs the processes starting with step S1. When the ignition switch 3 is turned off, the viewpoint location computation device 1 ends the process.

Figure 12:
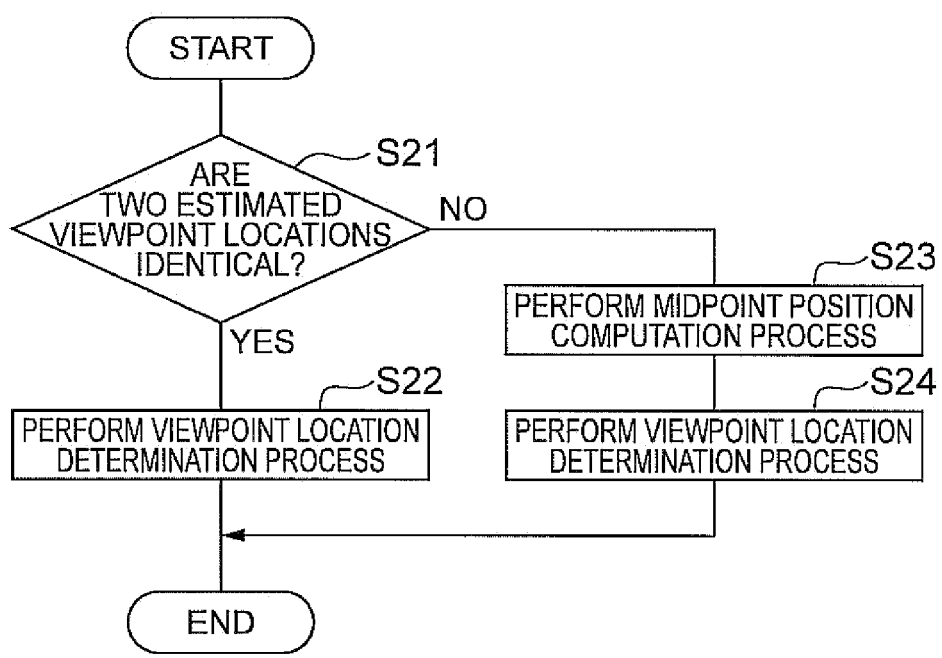
FIG. 12 is a flowchart illustrating the flow of a viewpoint location computation process illustrated in FIG. 11.

Subsequently, the above-described viewpoint location computation process of step S7 will be described with reference to FIG. 12. As illustrated in FIG. 12, in the viewpoint location computation process, the identical condition determination unit 15 determines whether the first and second estimated viewpoint locations EPRS and EPLS are identical (S21).

When the identical condition determination unit 15 determines that the first and second estimated viewpoint locations EPRS and EPLS are identical, the viewpoint location computation unit 16 performs a viewpoint location determination process of determining the first or second estimated viewpoint location EPRS or EPLS as a computation result of the viewpoint location EP of the driver (S22).

On the other hand, when the identical condition determination unit 15 determines that the first and second estimated viewpoint locations EPRS and EPLS are not identical, the viewpoint location computation unit 16 performs a midpoint position computation process of computing a midpoint position between the first and second estimated viewpoint locations EPRS and EPLS (S23). After that, the viewpoint location computation unit 16 performs a viewpoint location determination process of determining the computed midpoint position as a computation result of the viewpoint location EP of the driver (S24).

Next, the operational effects of the above-described viewpoint location computation device 1 will be described.

According to the viewpoint location computation device 1 according to the first embodiment described above, the viewpoint location EP of the driver is computed based on the angles of the side-view mirrors R and L and the driver's seating center plane T based on the fact that the driver adjusts the angles of the side-view mirrors R and L according to the viewpoint location EP of the driver. Thus, it is possible to easily compute the viewpoint location EP of the driver without the need to equip a new device for detecting the viewpoint location.

Further, in the viewpoint location computation device 1, when the first and second estimated viewpoint locations obtained from the side-view mirrors R and L are identical, the first or second estimated viewpoint location EPRS or EPLS is computed as the viewpoint location EP. When the first and second estimated viewpoint locations are not identical, the viewpoint location EP is computed based on the respective estimated viewpoint locations. Thus, according to the viewpoint location computation device 1, when the first and second estimated viewpoint locations are not identical, the viewpoint location EP is computed appropriately rather than assuming that the first or second estimated viewpoint location EPRS or EPLS is the viewpoint location EP. Therefore, it is possible to improve the reliability associated with computation of the viewpoint location EP of the driver.

Further, according to the viewpoint location computation device 1, the determination on identicalness and the computation of the viewpoint location EP are performed with respect to only the estimated viewpoint locations that are present in the predetermined eye range ER set to the vehicle. Thus, it is possible to prevent an estimated viewpoint location which is computed erroneously due to failure or the like from being computed as the viewpoint location EP and to improve the reliability associated with computation of the viewpoint location EP.

Further, according to the viewpoint location computation device 1, when any one of the estimated viewpoint locations is determined not to be present within the eye range ER, a warning signal is output to the driver since it is considered that the angle of any one of the side-view mirrors R and L or the driving posture of the driver is not proper. In this way, when the angle of the vehicle-mounted mirror R or L or the driving posture of the driver is not proper, since it is possible to urge the driver to check the angle or the driving posture, it is possible to improve the driving safety of the vehicle.

Further, in the viewpoint location computation device 1, the estimated viewpoint locations are computed based on the angles of the right side-view mirror R and the left side-view mirror L which the driver frequently checks during driving. Thus, it is possible to improve the computation accuracy of the viewpoint location EP of the driver as compared to a case where the estimated viewpoint locations are computed from the angles of the other vehicle-mounted mirrors.

Second Embodiment

Figure 13:
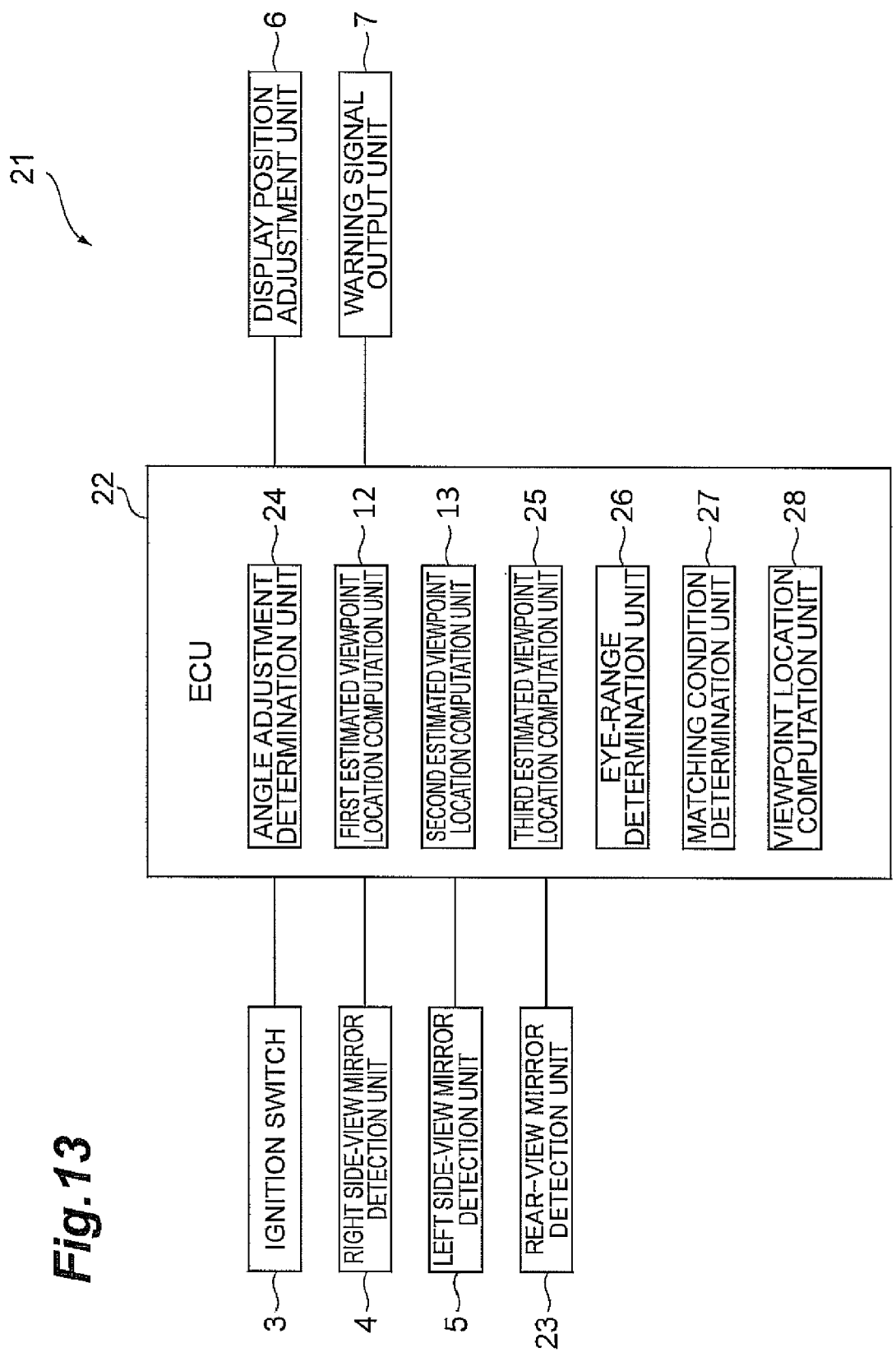
FIG. 13 is a block diagram illustrating a viewpoint location computation device according to a second embodiment.
Figure 14:
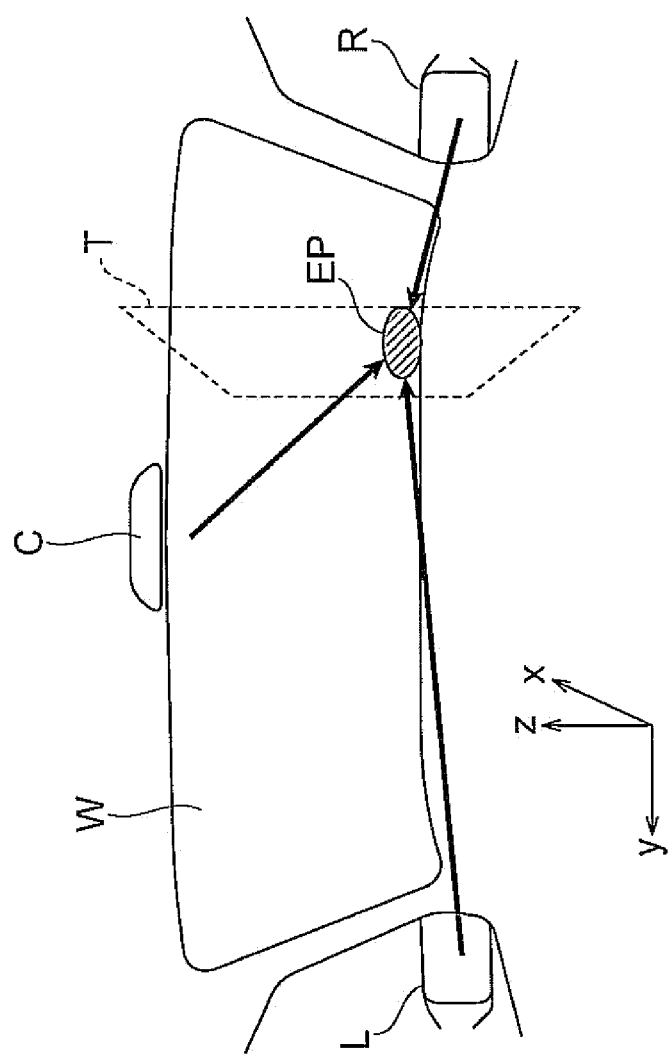
FIG. 14 is a schematic view for explaining computation of a viewpoint location.

As illustrated in FIGS. 13 and 14, a viewpoint location computation device 21 according to the second embodiment is mainly different from the viewpoint location computation device 1 according to the first embodiment in that the viewpoint location EP of the driver is computed further using a third estimated viewpoint location that is based on the angle of a rear-view mirror C.

Specifically, the viewpoint location computation device 21 according to the second embodiment computes the viewpoint location EP of the driver based on the fact that the driver adjusts the angle of the rear-view mirror C so as to be able to see a predetermined check position.

Figure 15:
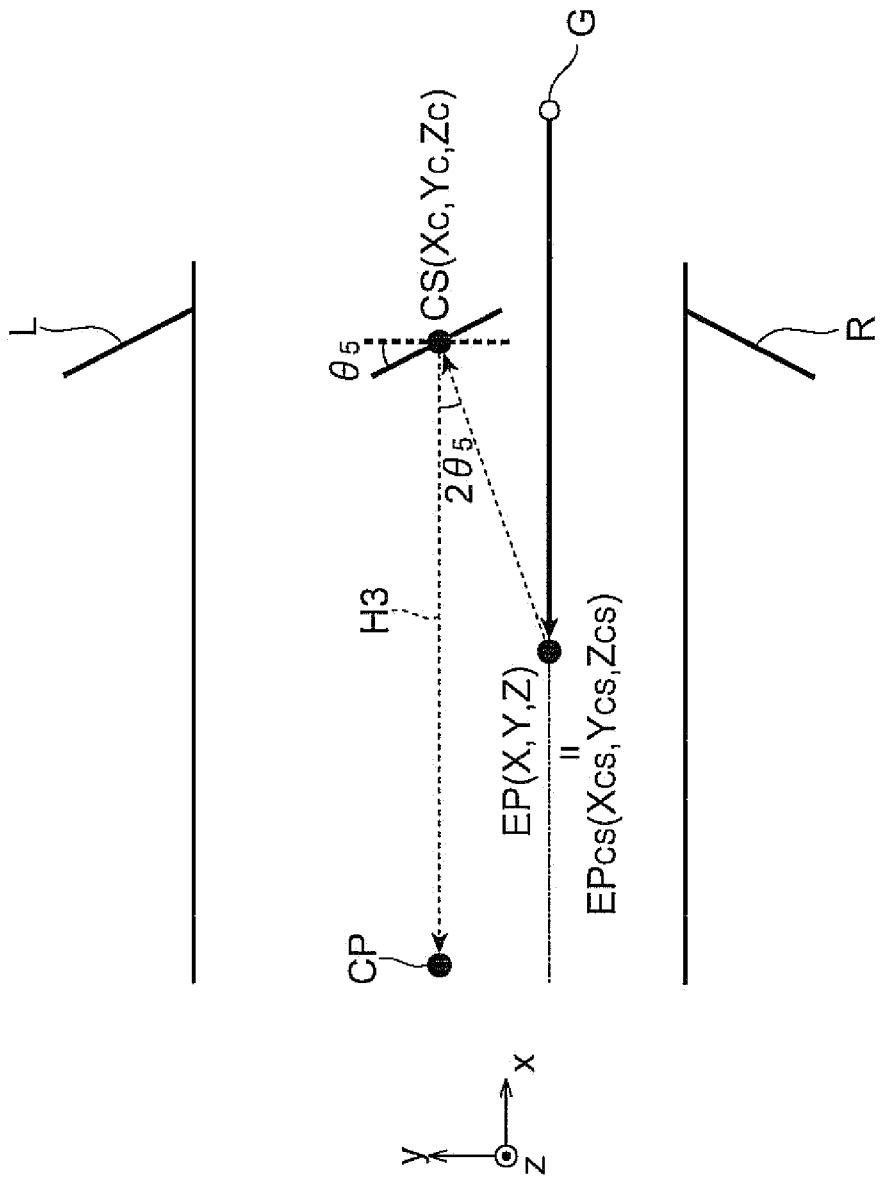
FIG. 15 is a schematic plan view for explaining computation of the viewpoint location.

Here, as illustrated in FIG. 15, the center position CS of the rear-view mirror C of the vehicle is expressed as a coordinate (Xc, Ye, Zc). With regard to the rear-view mirror C of the vehicle, first, a geometric relationship in the XY-plane will be discussed. An angle of the rear-view mirror C in the XY-plane, tilted from the initial state where the rear-view mirror C is parallel with the YZ-plane is expressed as θ5. A case where the driver can see the check position CP on the rear side of the vehicle in a state where the angle of the rear-view mirror C is adjusted to θ5 will be considered. In this case, light that moves from the check position CP on the rear side of the vehicle toward the rear-view mirror C is reflected from the mirror surface of the rear-view mirror C to reach the viewpoint location EP of the driver. An optical path of this light is denoted by H3. Moreover, an intersection point between the optical path H3 and the driver's seating center plane T is estimated as a third estimated viewpoint location EPCS.

The optical path H3 has a geometric relationship as illustrated in FIG. 15 as seen from the axial direction Z, and the magnitude of an angle that the optical path H3 forms in the XY-plane with respect to the center position CS of the rear-view mirror C as an apex is equal to twice of θ5. Due to this, when the coordinate of the third estimated viewpoint location EPCS which is the intersection point between the optical path H3 and the driver's seating center plane T is (XCS, YCS, ZCS), XCS is expressed as Equation (17) below.

[Mathematical Formula 11]

$$X_{CS}+X_C+(Y-Y_C)/\tan 2\theta_5 = X_C+(y_0-Y_C)\tan 2\theta_5 \qquad (17)$$

Moreover, since the third estimated viewpoint location EPCS is present on the driver's seating center plane T, when the Y-coordinate of the driver's seating center plane T is y0, YCS which is the Y-coordinate of the third estimated viewpoint location is the same as y0.

Figure 16:
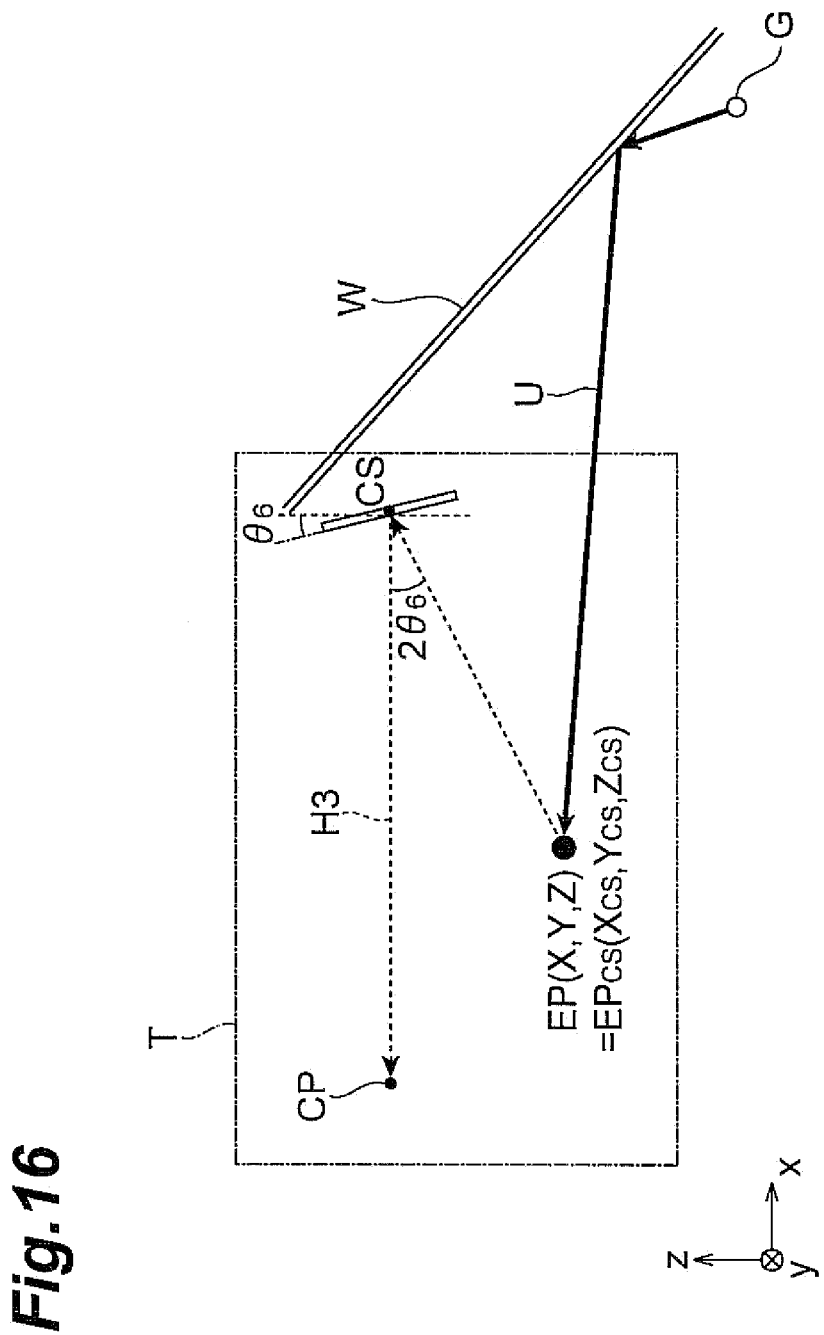
FIG. 16 is a schematic side view for explaining computation of the viewpoint location.

Next, a geometric relationship in the XZ-plane will be discussed. As illustrated in FIG. 16, the angle of the rear-view mirror C in the XY-plane, tilted from the initial state is expressed as θ6. In this case, the optical path H3 has a geometric relationship as illustrated in FIG. 16 as seen from the axial direction Y, and the magnitude of an angle that the optical path H3 forms in the XZ-plane with respect to the center position CS of the rear-view mirror C as an apex is equal to twice of θ6. Here, ZCS which is the Z-coordinate of the third estimated viewpoint location EPCS is expressed as Equation (18) below.

[Mathematical Formula 12]

$$Z_{CS} = Z_C + (X - X_C)/\tan 2\theta_1 \qquad (18)$$

The coordinate (XCS, YCS, ZCS) of the third estimated viewpoint location EPCS is obtained from Equations (17) and (18) and the Y-coordinate y0 of the driver's seating center plane T.

The viewpoint location computation device 21 of the second embodiment computes the viewpoint location EP of the driver based on the first, second, and third estimated viewpoint locations EPRS, EPLS, and EPCS.

The viewpoint location computation device 21 determines whether the first, second, and third estimated viewpoint locations EPRS, EPLS, and EPCS are present within the eye range ER illustrated in FIG. 7. The viewpoint location computation device 21 computes the elevation angles β, γ, and δ with respect to the first, second, and third estimated viewpoint locations EPRS, EPLS, and EPCS and determines whether the elevation angles β, γ, and δ fall within the allowable elevation angle range α1 to α2.

The viewpoint location computation device 21 determines that the estimated viewpoint location corresponding to an elevation angle which is determined to fall within the allowable elevation angle range α1 to α2 of the eye range ER is present within the eye range ER. The viewpoint location computation device 21 determines that the estimated viewpoint location corresponding to an elevation angle which is determined not to fall within the allowable elevation angle range α1 to α2 of the eye range ER is not present within the eye range ER.

When at least two elevation angles are determined not to fall within the allowable elevation angle range α1 to α2 of the eye range ER, the viewpoint location computation device 21 determines that the angle of any one of the side-view mirrors R and L and the rear-view mirror C or the driving posture of the driver is not proper and issues a warning signal to the driver.

When only two estimated viewpoint locations are determined to be present within the eye range ER, the viewpoint location computation device 21 computes the viewpoint location EP of the driver in a manner similar to the case of the first embodiment described above. That is, the viewpoint location computation device 21 determines whether the two estimated viewpoint locations are identical. When the two estimated viewpoint locations are identical, the viewpoint location computation device 21 computes the estimated viewpoint locations as the viewpoint location EP. When the two estimated viewpoint locations are not identical, the viewpoint location computation device 21 computes a midpoint position between the two estimated viewpoint locations as the viewpoint location EP. In this case, the coordinate (X, Y, Z) of the viewpoint location EP is obtained from Equations (19) to (21) below while defining the coordinate of one estimated viewpoint location as (Xa, Ya, Za) and the coordinate of the other estimated viewpoint location as (Xb, Yb, Zb).

[Mathematical Formula 13]

$$X = (X_a - X_b)/2 \qquad (19)$$

$$Y = y_0 \tag{20}$$

$$Z = (Z_a - Z_b)/2 \tag{21}$$

When all of the three estimated viewpoint locations are determined to be present within the eye range ER, the viewpoint location computation device 21 determines whether the first, second, and third estimated viewpoint locations EPRS, EPLS, and EPCS are identical. When all of the estimated viewpoint locations are determined to be identical, the viewpoint location computation device 21 computes any one of the estimated viewpoint locations as the viewpoint location EP. When only two estimated viewpoint locations are determined to be identical, the viewpoint location computation device 21 computes a midpoint position between the estimated viewpoint locations and the remaining estimated viewpoint location as the viewpoint location EP.

Figure 17:
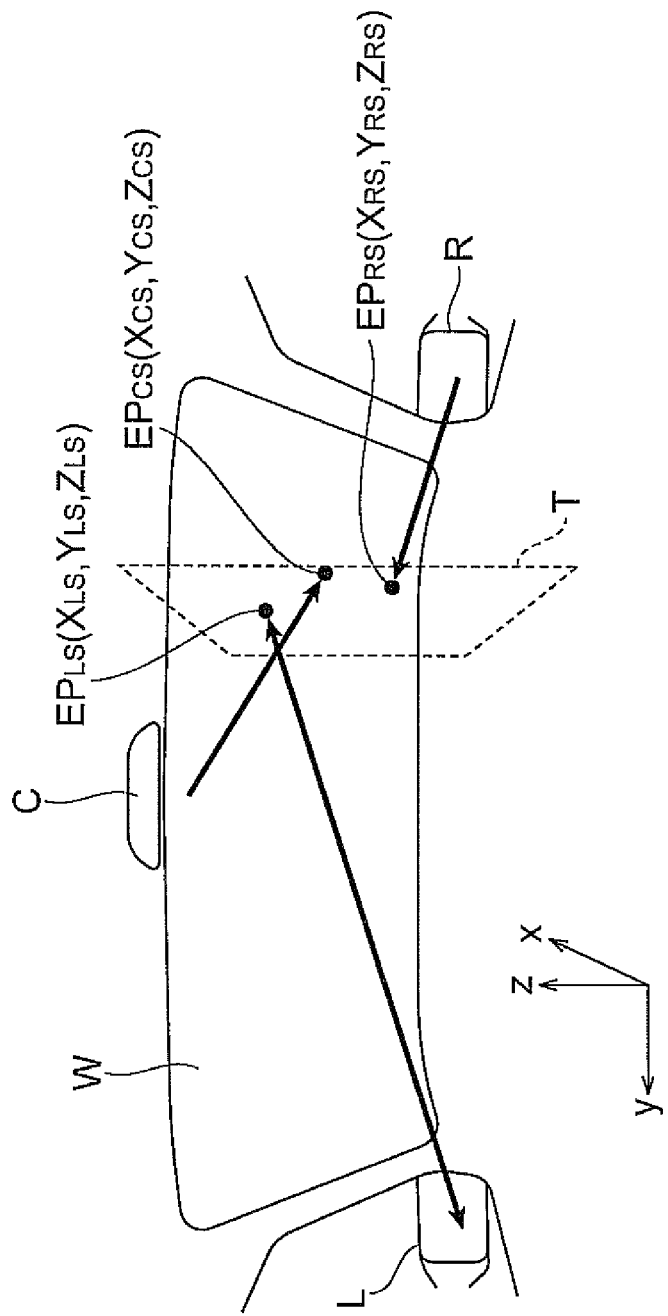
FIG. 17 is a schematic view for explaining a case where estimated viewpoint locations are not identical.
Figure 18:
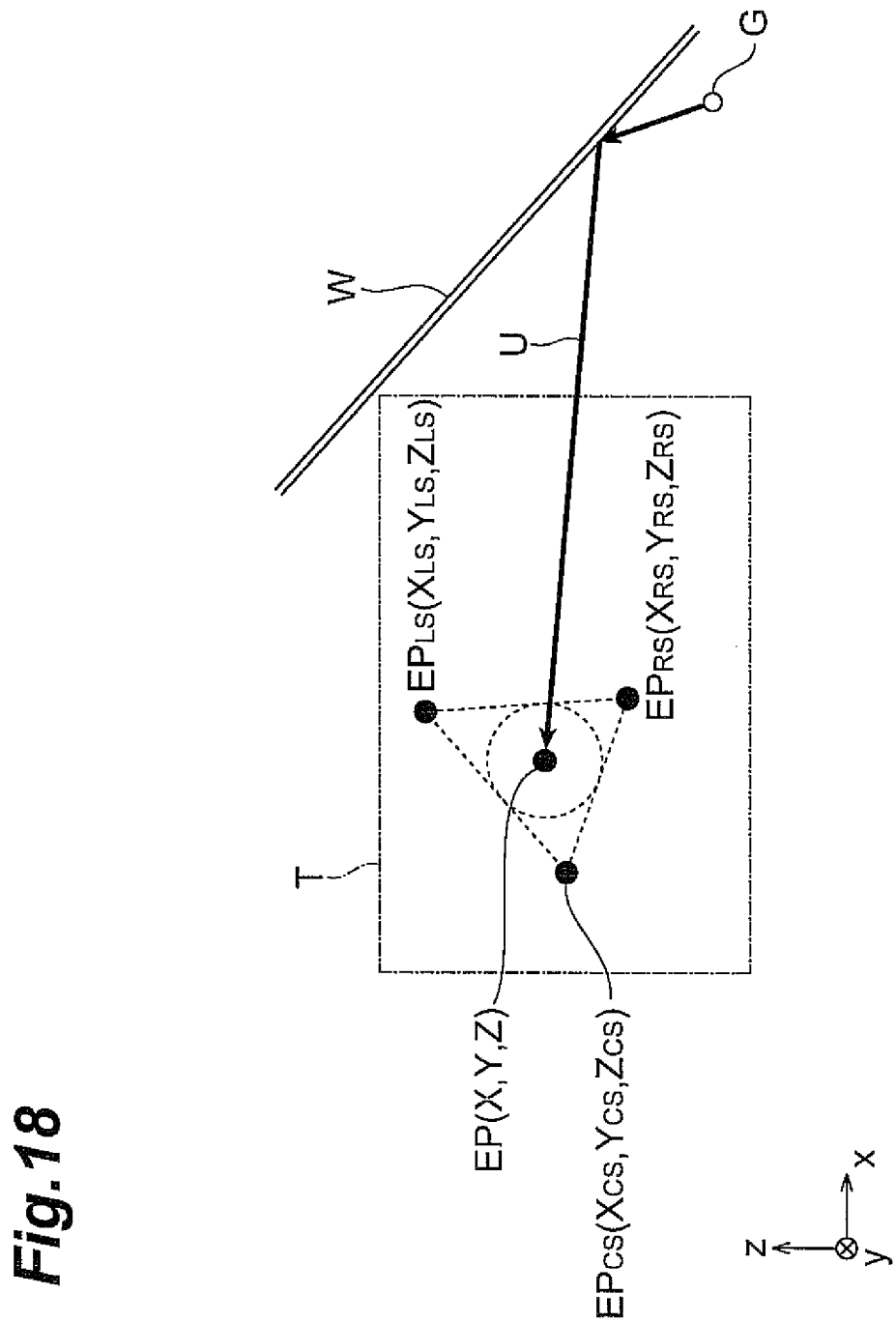
FIG. 18 is a schematic side view for explaining computation of the viewpoint location when estimated viewpoint locations are not identical.

When none of the estimated viewpoint locations are determined to be identical, the viewpoint location computation device 21 computes the position of an incenter of a triangle of which the apexes are located at the first, second, and third estimated viewpoint locations EPRS, EPLS, and EPCS as the viewpoint location EP of the driver (see FIGS. 17 and 18). Here, the triangle of which the apexes are located at the first, second, and third estimated viewpoint locations EPRS, EPLS, and EPCS will be discussed. When an edge that connects the first and third estimated viewpoint locations EPRS and EPCS is EdgeLS, an edge that connects the second and third estimated viewpoint locations EPLS and EPCS is EdgeRs, and an edge that connects the first and second estimated viewpoint locations EPRS and EPCS is EdgeCS, the lengths of the respective edges are expressed as Equations (22) to (24) below.

[Mathematical Formula 14]

$$Edge_{LS} = \sqrt{(X_{CS} - X_{RS})^2 + (Z_{CS} - Z_{RS})^2} \tag{22}$$

$$Edge_{RS} = \sqrt{(X_{CS} - X_{LS})^2 + (Z_{CS} - Z_{LS})^2} \tag{23}$$

$$Edge_{CS} = \sqrt{(X_{RS} - X_{LS})^2 + (Z_{RS} - Z_{LS})^2} \tag{24}$$

Thus, the viewpoint location EP which is the incenter located at the same distance from the edges EdgeLS, EdgeRS, and EdgeCS is obtained from Equation (25) below.

[Mathematical Formula 15]

$$EP(X, Y, Z) = \begin{pmatrix} \dfrac{Edge_{CS} \cdot X_{CS} + Edge_{RS} \cdot X_{RS} + Edge_{LS} \cdot X_{LS}}{Edge_{CS} + Edge_{RS} + Edge_{LS}}, \\ y_0, \dfrac{Edge_{CS} \cdot Z_{CS} + Edge_{RS} \cdot Z_{RS} + Edge_{LS} \cdot Z_{LS}}{Edge_{CS} + Edge_{RS} + Edge_{LS}} \end{pmatrix} \tag{25}$$

Next, the configuration of the above-described viewpoint location computation device 21 will be described. The description of portions of the configuration of the viewpoint location computation device 21, overlapping those of the viewpoint location computation device 1 according to the first embodiment will not be provided.

The viewpoint location computation device 21 according to the second embodiment includes a rear-view mirror detection unit 23. The rear-view mirror detection unit 23 is configured to detect the angle of the rear-view mirror C. The rear-view mirror detection unit 23 outputs the detected angle of the rear-view mirror C to the ECU 22 as a rear-view mirror angle signal. The rear-view mirror C corresponds to a third vehicle-mounted mirror described in the claims.

The ECU 22 of the viewpoint location computation device 21 according to the second embodiment includes an angle adjustment determination unit 24, a first estimated viewpoint location computation unit 12, a second estimated viewpoint location computation unit 13, a third estimated viewpoint location computation unit 25, an eye-range determination unit 26, an identical condition determination unit 27, and a viewpoint location computation unit 28.

The angle adjustment determination unit 24 determines whether the angle of any one of the mirrors is adjusted based on the right side-view mirror angle signal of the right side-view mirror detection unit 4, the left side-view mirror angle signal of the left side-view mirror detection unit 5, and the rear-view mirror angle signal of the rear-view mirror detection unit 23.

When the angle adjustment determination unit 24 determines that the angle of the rear-view mirror C is adjusted, the third estimated viewpoint location computation unit 25 updates information on the angle of the rear-view mirror C based on the rear-view mirror angle signal. The third estimated viewpoint location computation unit 25 computes the third estimated viewpoint location EPCS based on the angle of the rear-view mirror C and the driver's seating center plane T. The third estimated viewpoint location computation unit 25 computes the elevation angle δ of the third estimated viewpoint location EPCS with respect to the gate G of the HUD 30. The third estimated viewpoint location computation unit 25 functions as third estimated viewpoint location computation means described in the claims.

The eye-range determination unit 26 determines whether the first, second, and third estimated viewpoint locations EPRS, EPLS, and EPCS are present within a predetermined eye range ER. The eye-range determination unit 26 determines whether the respective estimated viewpoint locations are present within the eye range ER by determining whether the elevation angles β, γ, and δ fall within the allowable elevation angle range α1 to α2 of the eye range ER. When at least two elevation angles are determined not to fall within the allowable elevation angle range α1 to α2 of the eye range ER, the eye-range determination unit 26 sends a warning signal output command to the warning signal output unit 7.

When the eye-range determination unit 26 determines that at least two elevation angles fall within the allowable elevation angle range α1 to α2 of the eye range ER, the identical condition determination unit 27 determines whether the estimated viewpoint locations corresponding to the elevation angles are identical.

When the identical condition determination unit 27 determines that all of the estimated viewpoint locations are identical, the evaluating unit 28 computes any one of the estimated viewpoint locations as the viewpoint location EP. When the identical condition determination unit 27 determines that only two estimated viewpoint locations are identical, the viewpoint location computation unit 28 computes the midpoint position between the identical two estimated viewpoint locations and the remaining estimated viewpoint location as the viewpoint location EP.

When the identical condition determination unit 27 determines that none of the estimated viewpoint locations are identical, the viewpoint location computation unit 28 computes the position of an incenter of a triangle of which the apexes are located at the first, second, and third estimated viewpoint locations EPRS, EPLS, and EPCS as the viewpoint location EP of the driver (see FIGS. 17 and 18).

When the viewpoint location EP is computed, the viewpoint location computation unit 28 determines whether the computed viewpoint location EP and the previous viewpoint location of the driver stored therein are identical. When the computed viewpoint location EP and the previous viewpoint location of the driver are determined to be identical, the viewpoint location computation unit 28 ends the process. On the other hand, when the computed viewpoint location EP and the previous viewpoint location of the driver are determined not to be identical, the viewpoint location computation unit 28 updates the information on the viewpoint location of the driver based on the computed viewpoint location EP. The viewpoint location computation unit 28 sends a display position adjustment command corresponding to the updated viewpoint location EP to the display position adjustment unit 6.

Next, the process of the above-described viewpoint location computation device 21 will be described with reference to the drawings.

Figure 19:
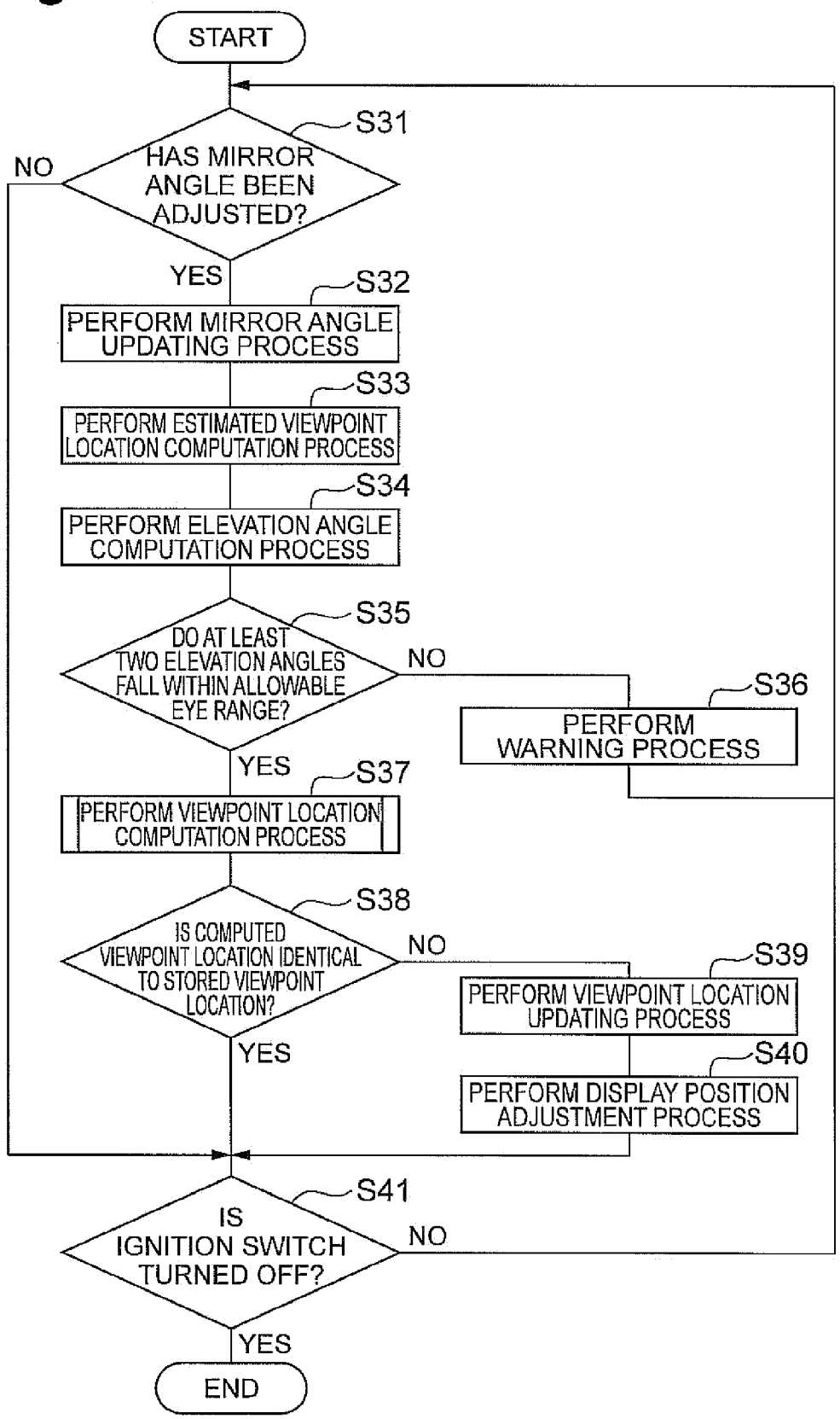
FIG. 19 is a flowchart illustrating the flow of the process of the viewpoint location computation device according to the second embodiment.

As illustrated in FIG. 19, when the ignition switch 3 is turned on, and the device starts, the angle adjustment determination unit 24 of the viewpoint location computation device 21 determines whether the angle of any one of the mirrors is adjusted based on the right side-view mirror angle signal of the right side-view mirror detection unit 4, the left side-view mirror angle signal of the left side-view mirror detection unit 5, and the rear-view mirror angle signal of the rear-view mirror detection unit 23 (S31). When the angle adjustment determination unit 24 determines that the angle of any one of the mirrors is not adjusted, the flow proceeds to step S41.

When the angle adjustment determination unit 24 determines that the angle of the mirror is adjusted, a mirror angle updating process of step S32 is performed. In the mirror angle updating process, when the angle adjustment determination unit 24 determines that the angle of the right side-view mirror R is adjusted, the first estimated viewpoint location computation unit 12 updates the information on the angle of the right side-view mirror R based on the right side-view mirror angle signal. Similarly, when the angle adjustment determination unit 24 determines that the angle of the left side-view mirror L is adjusted, the second estimated viewpoint location computation unit 13 updates the information on the angle of the left side-view mirror L based on the left side-view mirror angle signal. When the angle adjustment determination unit 24 determines that the angle of the rear-view mirror C is adjusted, the third estimated viewpoint location computation unit 25 updates the information on the angle of the rear-view mirror C based on the rear-view mirror angle signal.

Subsequently, an estimated viewpoint location computation process of step S33 is performed. In the estimated viewpoint location computation process, when the mirror angle updating process is performed, the first estimated viewpoint location computation unit 12 computes the first estimated viewpoint location EPRS based on the updated angle of the right side-view mirror R and the driver's seating center plane T. Similarly, when the mirror angle updating process is performed, the second estimated viewpoint location computation unit 13 computes the second estimated viewpoint location EPLS based on the updated angle of the left side-view mirror L updated in the mirror angle updating process and the driver's seating center plane T. When the mirror angle updating process is performed, the third estimated viewpoint location computation unit 25 computes the third estimated viewpoint location EPCS based on the updated angle of the rear-view mirror C and the driver's seating center plane T.

Subsequently, an elevation angle computation process of step S34 is performed. In the elevation angle computation process, the first estimated viewpoint location computation unit 12 computes the elevation angle $\beta$ of the first estimated viewpoint location EPRS computed in the estimated viewpoint location computation process. Similarly, the second estimated viewpoint location computation unit 13 computes the elevation angle $\gamma$ of the second estimated viewpoint location EPLS computed in the estimated viewpoint location computation process. The third estimated viewpoint location computation unit 25 computes the elevation angle $\delta$ of the third estimated viewpoint location EPCS computed in the estimated viewpoint location computation process.

Subsequently, the eye-range determination unit 26 determines whether at least two of the elevation angles $\beta$, $\gamma$, and $\delta$ fall within the allowable elevation angle range $\alpha 1$ to $\alpha 2$ of the eye range ER (S35). When the eye-range determination unit 26 determines that at least two elevation angles do not to fall within the allowable elevation angle range $\alpha 1$ to $\alpha 2$ of the eye range ER, a warning process of sending a warning signal output command to the warning signal output unit 7 is performed (S36). The warning signal output unit 7 outputs an audible warning message corresponding to the warning signal output command to the driver.

When the eye-range determination unit 26 determines that at least two elevation angles fall within the allowable elevation angle range $\alpha 1$ to $\alpha 2$ of the eye range ER, a viewpoint location computation process of computing the viewpoint location EP of the driver based on the estimated viewpoint location having the elevation angle that falls within the allowable elevation angle range $\alpha 1$ to $\alpha 2$ is performed (S37). The viewpoint location computation process will be described later.

When the viewpoint location EP is computed, the viewpoint location computation unit 28 determines whether the computed viewpoint location EP is identical to the previous viewpoint location of the driver stored therein (S38). When the viewpoint location computation unit 28 determines that the computed viewpoint location EP is identical to the previous viewpoint location of the driver, the flow proceeds to step S41.

On the other hand, when the computed viewpoint location EP is determined not to be identical to the previous viewpoint location of the driver, the viewpoint location computation unit 28 updates the information on the viewpoint location of the driver based on the computed viewpoint location EP (S39). The viewpoint location computation unit 28 sends a display position adjustment command corresponding to the updated viewpoint location EP to the display position adjustment unit 6 (S40). The display position adjustment unit 6 adjusts the display position of the virtual image V of the HUD 30 according to the display position adjustment command.

In step S41, it is determined whether the ignition switch 3 is turned off. When the ignition switch 3 is not turned off, the viewpoint location computation device 21 repeatedly performs the processes starting with step S31. When the ignition switch 3 is turned off, the viewpoint location computation device 21 ends the process.

Figure 20:
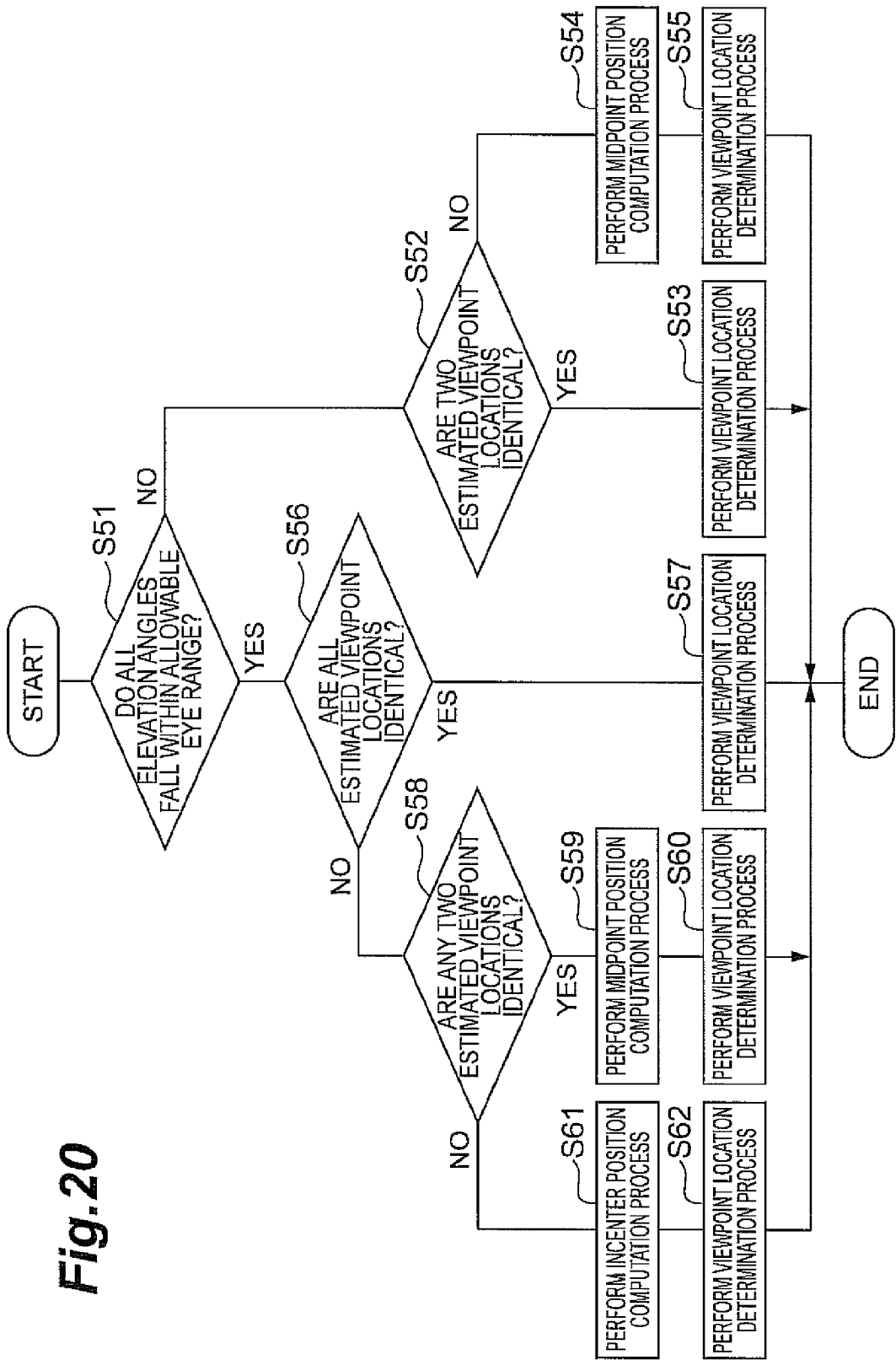
FIG. 20 is a flowchart illustrating the flow of a viewpoint location computation process illustrated in FIG. 19.

Subsequently, the above-described viewpoint location computation process of step S37 will be described with reference to FIG. 20. As illustrated in FIG. 20, in the viewpoint location computation process, the eye-range determination unit 26 determines whether all of the elevation angles $\beta$, $\gamma$, and $\delta$ fall within the allowable elevation angle range $\alpha 1$ to $\alpha 2$ of the eye range ER (S51).

When the eye-range determination unit 26 determines that all of the elevation angles $\beta$, $\gamma$, and $\delta$ does not fall within the allowable elevation angle range $\alpha 1$ to $\alpha 2$ of the eye range ER, the identical condition determination unit 27 determines whether two estimated viewpoint locations having the elevation angles that fall within the allowable elevation angle range α1 to α2 are identical (S52). When the identical condition determination unit 27 determines that two estimated viewpoint locations are identical, the viewpoint location computation unit 28 performs a viewpoint location determination process of determining any one of the estimated viewpoint locations as a computation result of the viewpoint location EP of the driver (S53).

On the other hand, when the identical condition determination unit 27 determines that two estimated viewpoint locations are not identical, the viewpoint location computation unit 28 performs a midpoint position computation process of computing the midpoint position between these estimated viewpoint locations (S54). After that, the viewpoint location computation unit 28 performs a viewpoint location determination process of determining the computed midpoint position as a computation result of the viewpoint location EP of the driver (S55).

When the eye-range determination unit 26 determines in step S51 that all of the elevation angles γ, γ, and δ fall within the allowable elevation angle range α1 to α2 of the eye range ER, the identical condition determination unit 27 determines whether all of the estimated viewpoint locations are identical (S56). When the identical condition determination unit 27 determines that all of the estimated viewpoint locations are identical, the viewpoint location computation unit 28 performs a viewpoint location determination process of determining any one of the estimated viewpoint locations as a computation result of the viewpoint location EP of the driver (S57).

On the other hand, when all of the estimated viewpoint locations are determined not to be identical, the identical condition determination unit 27 determines whether any two estimated viewpoint locations are identical (S58). When the identical condition determination unit 27 determines that any two estimated viewpoint locations are identical, the viewpoint location computation unit 28 performs a midpoint position computation process of computing the midpoint position between the identical estimated viewpoint locations and the remaining estimated viewpoint location (S59). After that, the viewpoint location computation unit 28 performs a viewpoint location determination process of determining the computed midpoint position as a computation result of the viewpoint location EP of the driver (S60).

When the identical condition determination unit 27 determines in step S58 that any two estimated viewpoint locations are not identical, the viewpoint location computation unit 28 performs an incenter position computation process of computing the position of the incenter of a triangle of which the apexes are located at the first, second, and third estimated viewpoint locations EPRS, EPLS, and EPCS(S61). After that, the viewpoint location computation unit 28 performs a viewpoint location determination process of determining the computed incenter position as a computation result of the viewpoint location EP of the driver (S62).

Next, the operational effects of the above-described viewpoint location computation device 21 will be described.

According to the viewpoint location computation device 21 according to the second embodiment described above, it is possible to obtain the same operational effects as those of the viewpoint location computation device 1 according to the first embodiment. Further, according to the viewpoint location computation device 21, since the viewpoint location of the driver is computed based on three estimated viewpoint locations, it is possible to further improve the computation accuracy and the reliability as compared to a case of computing the viewpoint location based on two estimated viewpoint locations. Further, since an estimated viewpoint location that is not present within the eye range ER is not used as the basis of the computation of the viewpoint location EP, even when there is an error in any one of the estimated viewpoint locations, it is possible to prevent a pronounced decrease in the computation accuracy of the viewpoint location EP. This contributes to improving the device reliability.

Moreover, in the viewpoint location computation device 21, the estimated viewpoint locations are obtained from three vehicle-mounted mirrors of the right side-view mirror R, the left side-view mirror L, and the rear-view mirror C. As above, since the estimated viewpoint locations are computed from the angles of the right side-view mirror R, the left side-view mirror L, and the rear-view mirror C which are necessary for checking a rearward visibility of the driver, it is advantageous to improving the computation accuracy of the viewpoint location EP of the driver as compared to a case of computing the estimated viewpoint location from the angles of the other vehicle-mounted mirrors.

Further, according to the viewpoint location computation device 21, when any two of the three estimated viewpoint locations are determined to be identical, a midpoint position located at the same distance between the estimated viewpoint locations and the remaining estimated viewpoint location is computed as the viewpoint location EP. When all of the estimated viewpoint locations are not identical, the position of the incenter of a triangle of which the apexes are located at the three estimated viewpoint locations is computed as the viewpoint location. Therefore, according to the viewpoint location computation device 21, even when all of the estimated viewpoint locations are not identical, it is possible to compute the viewpoint location appropriately based on the positional relationship of the respective estimated viewpoint locations.

The present invention is not limited to the embodiments described above.

For example, in the viewpoint location computation device 1 according to the first embodiment, the rear-view mirror C or another vehicle-mounted mirror such as an auxiliary mirror for large vehicles may be employed instead of the right side-view mirror R or the left side-view mirror L. Moreover, in the viewpoint location computation device 21 according to the second embodiment, other vehicle-mounted mirrors may be employed instead of the right side-view mirror R, the left side-view mirror L, and the rear-view mirror C.

Figure 21:
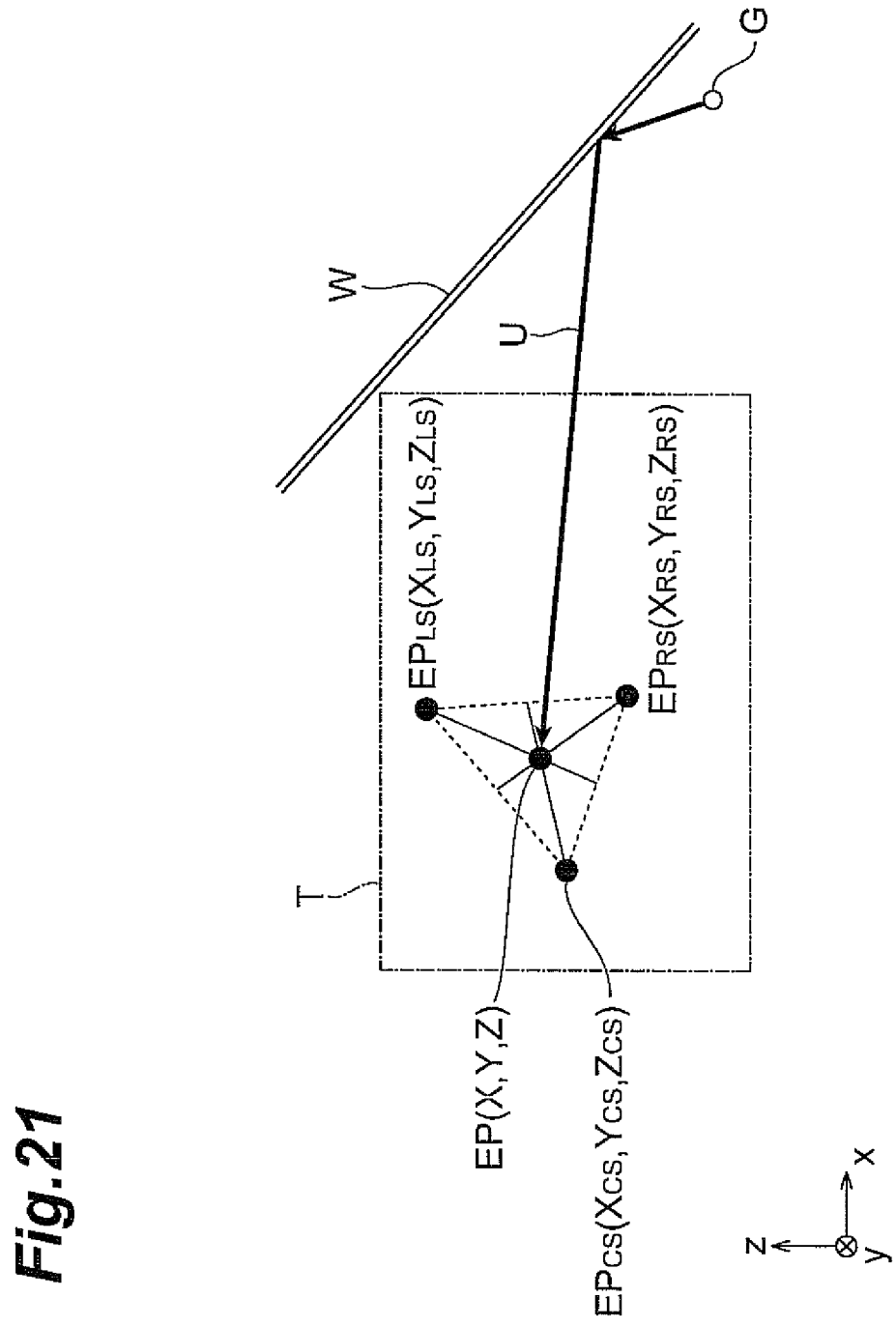
FIG. 21 is a schematic side view for explaining another example associated with computation of the viewpoint location.

Moreover, in the viewpoint location computation device 21 according to the second embodiment, when all of the estimated viewpoint locations are not identical, the center position of the triangle may be computed as the viewpoint location EP of the driver instead of the incenter position of the triangle of which the apexes are located at the respective estimated viewpoint locations. Here, when the coordinate of the first estimated viewpoint location EPRS is (XRS, YRS, ZRS), the coordinate of the second estimated viewpoint location EPLS is (XLS, YLS, ZLS), and the coordinate of the third estimated viewpoint location EPCS is (XCS, YCS, ZCS), the coordinate (X, Y, Z) of the viewpoint location EP which is the center position of the triangle is obtained from Equation (26) below (see FIG. 21). In this case, it is also possible to compute the viewpoint location EP appropriately based on the positional relationship of the respective estimated viewpoint locations and to obtain a highly reliable computation result.

[Mathematical Formula 16]

$$EP(X, Y, Z) = \left( \frac{X_{CS} + X_{RS} + X_{LS}}{3}, y_0, \frac{Z_{CS} + Z_{RS} + Z_{LS}}{3} \right) \quad (26)$$

Further, in the viewpoint location computation device 21 according to the second embodiment, when all of the estimated viewpoint locations are not identical, the respective estimated viewpoint locations may be weighted according to the type or the like of the vehicle-mounted mirror, and the viewpoint location EP may be computed based on the positional relationship between the weighted results and the respective estimated viewpoint locations. In this case, it is possible to appropriately compute the viewpoint location EP according to the estimation accuracy of the respective estimated viewpoint locations and the reliability.

Moreover, in the viewpoint location computation device 21 according to the second embodiment, the warning signal is output when at least two elevation angles do not fall within the allowable elevation angle range α1 to α2 of the eye range ER. However, the warning signal may be output when any one of the elevation angles does not fall within the allowable elevation angle range α1 to α2 of the eye range ER. In this way, it is possible to inform the driver of the fact that any one of the vehicle-mounted mirrors is not adjusted to a proper angle.

Moreover, in the respective embodiments described above, although whether the estimated viewpoint location is present within the predetermined eye range ER is determined, the determination on the eye range ER may not necessarily be performed. That is, the viewpoint location EP may be computed regardless of whether the computed estimated viewpoint location is present within the eye range ER.

INDUSTRIAL APPLICABILITY

The present invention can be used in a viewpoint location computation device that computes the viewpoint location of a driver of a vehicle.

REFERENCE SIGNS LIST 1, 21: VIEWPOINT LOCATION COMPUTATION DEVICE
2: ECU
3: IGNITION SWITCH
4: RIGHT SIDE-VIEW MIRROR DETECTION UNIT
5: LEFT SIDE-VIEW MIRROR DETECTION UNIT
6: DISPLAY POSITION ADJUSTMENT UNIT
7: WARNING SIGNAL OUTPUT UNIT
12: FIRST ESTIMATED VIEWPOINT LOCATION COMPUTATION UNIT (FIRST ESTIMATED VIEWPOINT LOCATION COMPUTATION MEANS)
13: SECOND ESTIMATED VIEWPOINT LOCATION COMPUTATION UNIT (SECOND ESTIMATED VIEWPOINT LOCATION COMPUTATION MEANS)
23: REAR-VIEW MIRROR DETECTION UNIT
11, 24: ANGLE ADJUSTMENT DETERMINATION UNIT
25: THIRD ESTIMATED VIEWPOINT LOCATION COMPUTATION UNIT (THIRD ESTIMATED VIEWPOINT LOCATION COMPUTATION MEANS)
14, 26: EYE-RANGE DETERMINATION UNIT (EYE-RANGE DE TERMINATION MEANS)
15, 27: MATCHING CONDITION DETERMINATION UNIT (MATCHING CONDITION DETERMINATION MEANS)
16, 28: VIEWPOINT LOCATION COMPUTATION UNIT (VIEWPOINT LOCATION COMPUTATION MEANS)
30: HUD
R: RIGHT SIDE-VIEW MIRROR (FIRST VEHICLE-MOUNTED MIRROR)
L: LEFT SIDE-VIEW MIRROR (SECOND VEHICLE-MOUNTED MIRROR)
C: REAR-VIEW MIRROR (THIRD VEHICLE-MOUNTED ED MIRROR)
T: DRIVER'S SEATING CENTER PLANE (PLANE INCLUDING SEATING CENTER LOCATION)
W: WINDSHIELD
G: GATE OF HUD
EP: VIEWPOINT LOCATION
EPCS: THIRD ESTIMATED VIEWPOINT LOCATION
EPLS: SECOND ESTIMATED VIEWPOINT LOCATION
EPRS: FIRST ESTIMATED VIEWPOINT LOCATION
ER: EYE RANGE

The invention claimed is:

1. A viewpoint location computation device that computes a viewpoint location of a driver of a vehicle, comprising:
first estimated viewpoint location computation means for computing a first estimated viewpoint location of the driver based on an angle of a first vehicle-mounted mirror provided in the vehicle and a seating center location of the driver's seat of the vehicle;
second estimated viewpoint location computation means for computing a second estimated viewpoint location of the driver based on an angle of a second vehicle-mounted mirror provided in the vehicle and the seating center location of the driver's seat of the vehicle;
third estimated viewpoint location computation means for computing a third estimated viewpoint location of the driver based on an angle of a third vehicle-mounted mirror provided in the vehicle and the seating center location of the driver's seat of the vehicle,
identical condition determination means for determining whether the first, second, and third estimated viewpoint locations are identical; and
viewpoint location computation means for computing the first, second, or third estimated viewpoint location as the viewpoint location of the driver when the identical condition determination means determines that all of the estimated viewpoint locations are identical, wherein
when the identical condition determination means determines that none of the first, second, and third estimated viewpoint locations are identical, the viewpoint location computation means computes the viewpoint location of the driver based on the first, second, and third estimated viewpoint locations as the viewpoint location.

2. The viewpoint location computation device according to claim 1, wherein
the first, second, and third vehicle-mounted mirrors are a rear-view mirror of the vehicle, a right side-view mirror of the vehicle, and a left side-view mirror of the vehicle, respectively.

3. The viewpoint location computation device according to claim 1, further comprising
eye-range determination means for determining whether the estimated viewpoint location is present in a predetermined eye range, wherein
when the eye-range determination means determines that two or more of the estimated viewpoint locations are present within the eye range, the identical condition determination means determines whether the estimated viewpoint locations that are determined to be present within the eye range are identical, and
when the identical condition determination means determines that any one of the estimated viewpoint locations that are determined to be present within the eye range is not identical to the other estimated viewpoint location, the viewpoint location computation means computes the viewpoint location based on the estimated viewpoint locations that are determined to be present within the eye range.

4. The viewpoint location computation device according to claim 3, further comprising
  warning means for outputting a warning signal to the driver when the eye-range determination means determines that any one of the estimated viewpoint locations is not present within the eye range.

\* \* \* \* \*